United States Patent
Rifkin et al.

(10) Patent No.: US 12,083,967 B2
(45) Date of Patent: *Sep. 10, 2024

(54) MOUNTING DEVICE FOR MAINTAINING RIGID ALIGNMENT BETWEEN CAMERAS

(71) Applicant: Argo AI, LLC, Pittsburgh, PA (US)

(72) Inventors: Aaron Rifkin, Pittsburgh, PA (US); Elizabeth Ballard, Pittsburgh, PA (US); Casey Sennott, Pittsburgh, PA (US); Morgan Wagner, Pittsburgh, PA (US)

(73) Assignee: Argo AI, LLC, Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/348,526

(22) Filed: Jul. 7, 2023

(65) Prior Publication Data

US 2023/0347836 A1 Nov. 2, 2023

Related U.S. Application Data

(63) Continuation of application No. 17/731,400, filed on Apr. 28, 2022, now Pat. No. 11,738,698.

(51) Int. Cl.
*B60R 11/04* (2006.01)
*B60R 11/00* (2006.01)
*G03B 17/56* (2021.01)
*G03B 35/08* (2021.01)

(52) U.S. Cl.
CPC ............ *B60R 11/04* (2013.01); *G03B 17/561* (2013.01); *G03B 35/08* (2013.01); *B60R 2011/004* (2013.01)

(58) Field of Classification Search
CPC .. B60R 11/04; B60R 2011/004; G03B 17/561
See application file for complete search history.

(56) References Cited

U.S. PATENT DOCUMENTS

| 9,344,611 B2 | 5/2016 | Ohsumi |
| 2016/0227078 A1 | 8/2016 | Oh |
| 2018/0056871 A1 | 3/2018 | Karner et al. |
| 2019/0033692 A1* | 1/2019 | Lozovsky .......... F16M 11/2092 |

(Continued)

FOREIGN PATENT DOCUMENTS

| CN | 216186593 U | 4/2022 |
| EP | 3270221 A1 | 7/2017 |

*Primary Examiner* — Minh Q Phan
(74) *Attorney, Agent, or Firm* — The Webb Law Firm

(57) ABSTRACT

A mounting device includes an elongated beam having a first end portion, a second end portion, and a side surface extending between the first end portion and the second end portion. The mounting device also includes a first camera mount attached to the first end portion configured to support a first camera, a second camera mount attached to the second end portion configured to support a second camera, and a bracket for fixedly connecting the elongated beam to a vehicle. The bracket is positioned between the first end portion and the second end portion. The bracket includes at least one base configured to be attached to the vehicle and a wall extending from the at least one base comprising an opening sized to receive the elongated beam, such that engagement between the wall and the elongated beam restricts rotation of the elongated beam about multiple axes.

18 Claims, 14 Drawing Sheets

(56) References Cited

U.S. PATENT DOCUMENTS

| | | |
|---|---|---|
| 2019/0154109 A1 | 5/2019 | Liu et al. |
| 2020/0307467 A1 | 10/2020 | Skinner |
| 2021/0129989 A1 | 5/2021 | Schuett et al. |
| 2022/0063732 A1 | 3/2022 | Gaspar |

* cited by examiner

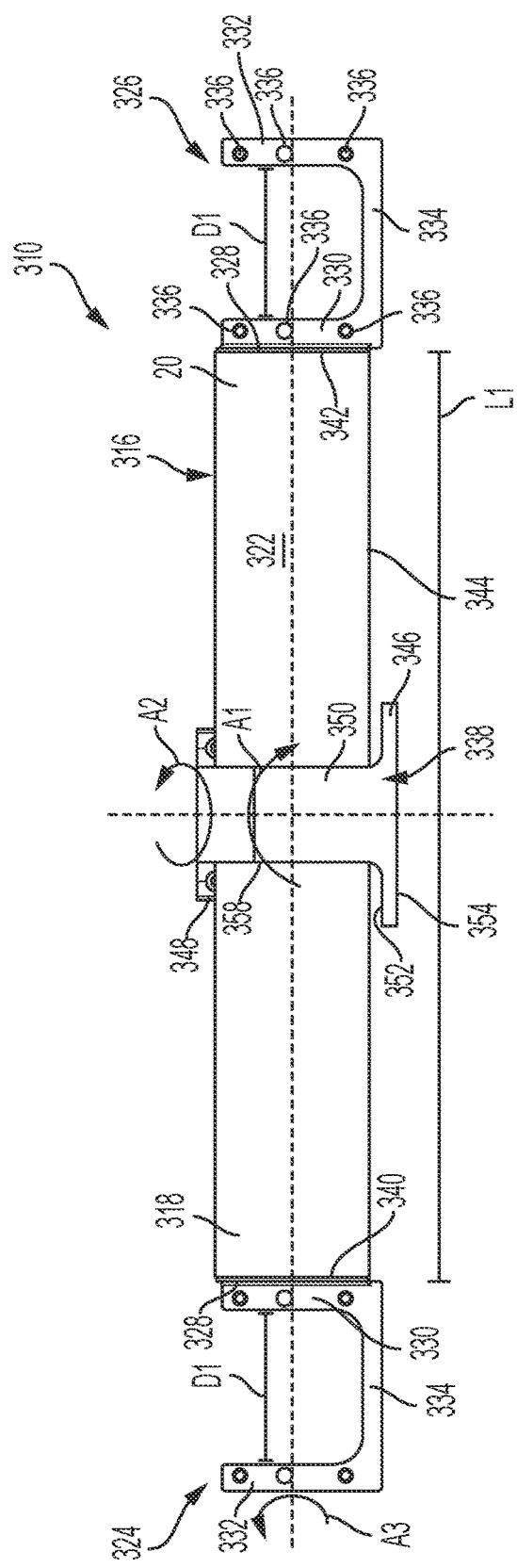
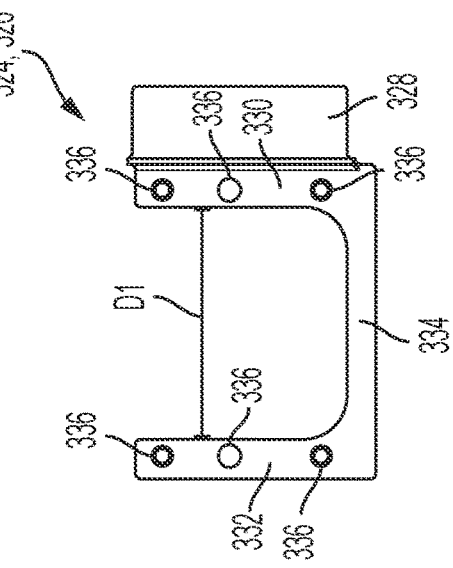
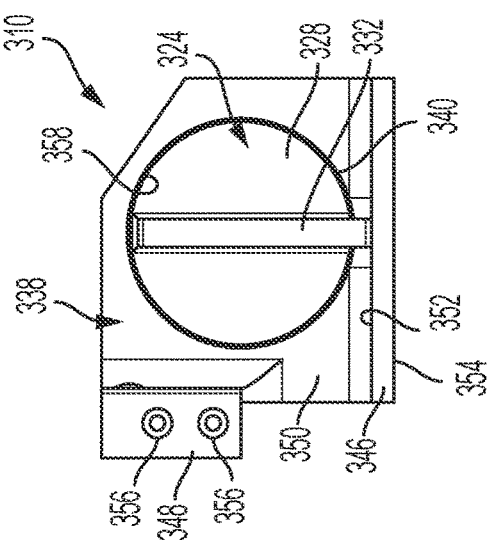
FIG. 3C
FIG. 3E
FIG. 3D

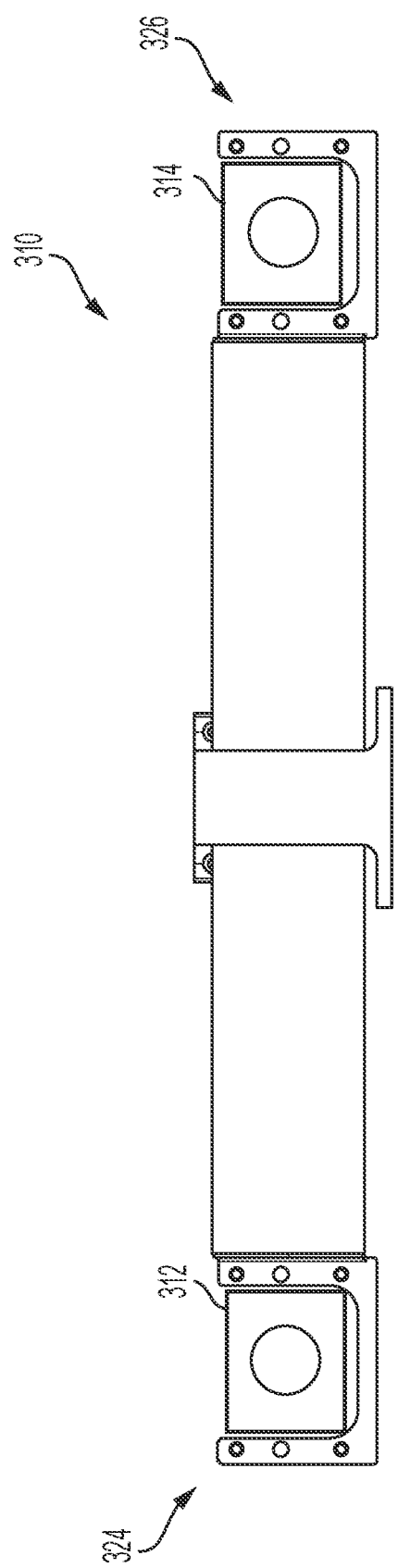

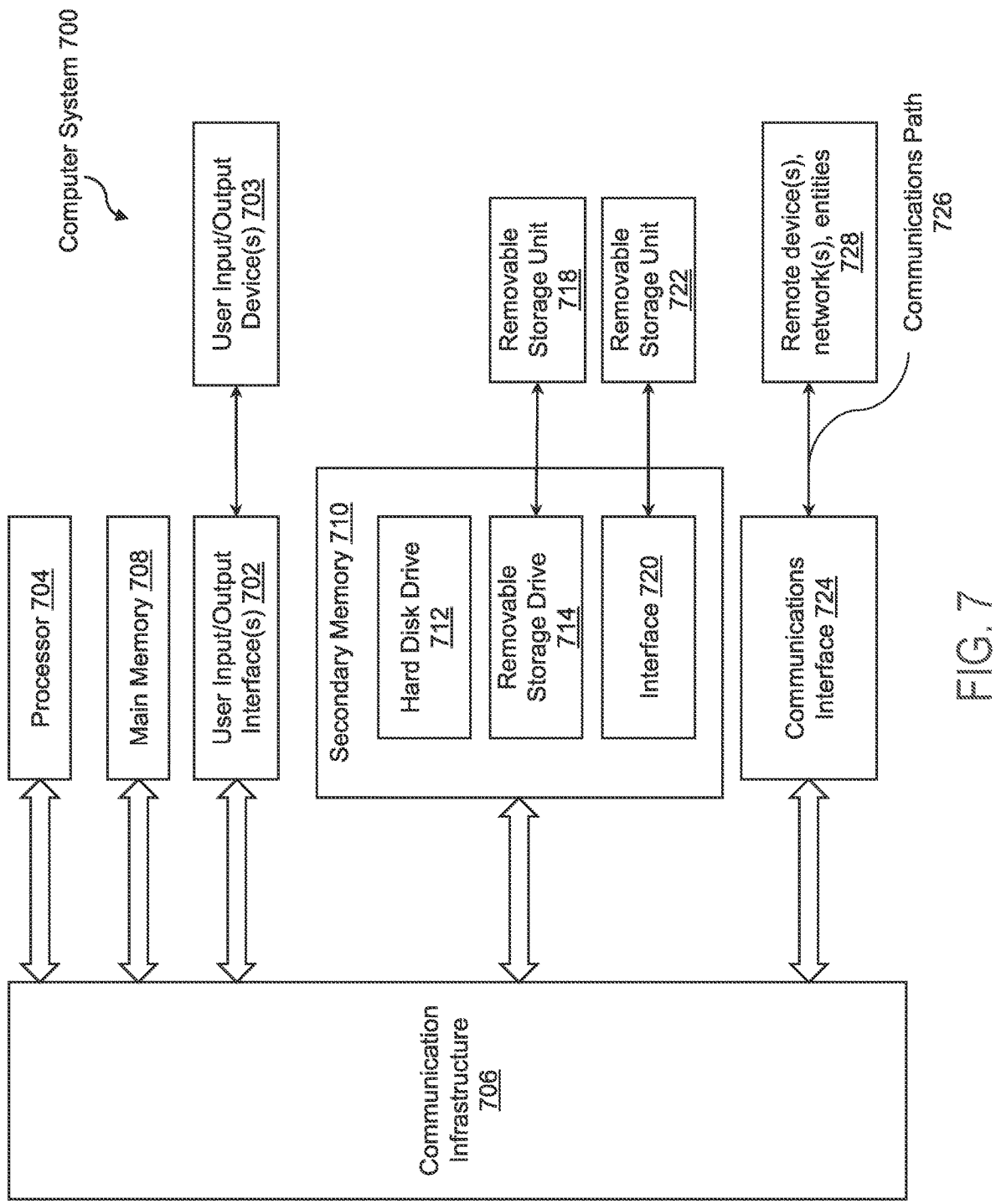

MOUNTING DEVICE FOR MAINTAINING RIGID ALIGNMENT BETWEEN CAMERAS

CROSS REFERENCE TO RELATED APPLICATION(S)

This application is a continuation of, and claims priority to, U.S. patent application Ser. No. 17/731,400, filed Apr. 28, 2022, the entire contents of which are incorporated by reference herein.

TECHNICAL FIELD

This disclosure relates generally to a mounting bracket or device for cameras and, in particular, to a mounting bracket or device configured to maintain proper rigid alignment between cameras to capture images that can be used to create stereo images of a scene. The mounting bracket or device can be configured for use with autonomous or semi-autonomous vehicles.

BACKGROUND

Accurate and consistent obstacle detection and navigation can be key elements of autonomous or semi-autonomous driving applications. Typically, an autonomous or semi-autonomous vehicle utilizes various on-board sensors to detect obstacles, other aspects of the roadway, and/or other aspects of an environment around the vehicle, which can be referred to as "perception information" or "perception data" representing what an ordinary driver would perceive in the surrounding environment of a vehicle. Examples of such sensors include one or more of vision sensors (e.g., camera(s)), radio detection and ranging (e.g., radar) sensors, and/or light detection and ranging (e.g., LiDAR) sensors. The perception information detected by the on-board sensors is processed and analyzed by image analysis software or a perception system to identify the objects surrounding the vehicle. The objects may include, for example, signaling devices, such as traffic lights, roadway boundaries, other vehicles, pedestrians, and/or obstacles.

Autonomous or semi-autonomous vehicles can include vision sensors or cameras configured to obtain stereo or three-dimensional images, which include information about distances between objects in a scene and/or information about a depth or distance between the cameras and the objects. Typically, a stereo camera assembly includes two or more cameras mounted to a portion of the autonomous vehicle. For example, two cameras may be positioned a distance apart, pointing in the same direction, and can be carefully aligned with each other to generate three-dimensional distance data. Obtained distance data may be used by various algorithms, such as the vehicle perception system, to help detect or identify objects, as well as for vehicle navigation. However, because stereo cameras rely on a tight, rigid alignment between the two or more cameras, which needs to be known by the software ahead of time, perception information obtained from these type of stereo camera assemblies may not be reliable when the vehicle is in motion and/or is exposed to certain environmental conditions. In particular, environmental conditions may affect alignment of and/or distance between the cameras reducing accuracy of distance information determined by the perception system. For example, in an autonomous vehicle application, while the vehicle is on the road, the stereo cameras may go out of alignment due to vibrations and/or due to thermal expansion or contraction (i.e., thermal shock) of portions of the vehicle or camera mount assembly. Distance information determined by the perception system from analysis of captured stereo images becomes more unreliable as misalignment of the cameras increases. In some cases, misalignment of the cameras of a stereo camera assembly can be addressed by frequently calibrating the cameras or through image processing to detect and account for any misalignment between the cameras. However, frequent calibration or image processing routines may be difficult to implement for certain vehicle perception systems.

SUMMARY

In order to address such issues, the mounting devices, image systems, vehicles, and methods of the present disclosure are configured to preserve alignment between cameras of a stereo camera assembly or system, thereby avoiding the need for frequent calibration or software processing routines to compensate for camera misalignment. Further, the mounting devices, image systems, vehicles, and methods of the present disclosure are configured for use with autonomous and semi-autonomous vehicles so that stereo or three-dimensional image processing techniques can be used to obtain distance information that can be used by existing vehicle perception systems to detect and identify objects in a scene and for vehicle navigation.

According to an aspect of the disclosure, a mounting device includes an elongated beam having a first end portion, a second end portion, and a side surface extending between the first end portion and the second end portion. The mounting device also includes: a first camera mount attached to the first end portion configured to support a first camera; a second camera mount attached to the second end portion configured to support a second camera; and a bracket for fixedly connecting the elongated beam to a vehicle. The bracket is positioned between the first end portion and the second end portion. The bracket includes at least one base configured to be attached to the vehicle and a wall extending from the at least one base comprising an opening sized to receive the elongated beam, such that engagement between the wall and the elongated beam restricts rotation of the elongated beam about multiple axes.

According to another aspect of the disclosure, a system includes a mounting device. The mounting device includes an elongated beam having a first end portion, a second end portion, and a side surface extending between the first end portion and the second end portion. The elongated beam also includes a first camera mount attached to the first end portion configured to support a first camera, a second camera mount attached to the second end portion configured to support a second camera, and a bracket positioned between the first end portion and the second end portion for fixedly connecting the elongated beam to a vehicle. The bracket includes at least one base configured to be attached to the vehicle and a wall extending from the at least one base having an opening sized to receive the elongated beam, such that engagement between the wall and the elongated beam restricts rotation of the elongated beam about multiple axes. The mounting device is fixedly connected to an exterior of a vehicle body by one or more fasteners extending through openings of the at least one base of the bracket of the mounting device. The system also includes a first camera attached to the first camera mount, a second camera attached to the second camera mount, and at least one processor in electrical communication with the first camera and the second camera. The at least one processor is configured to generate at least one stereo image of a scene based on a first image received from the first camera and a second image received from the second camera, wherein the first image and the second image are acquired substantially simultaneously.

According to another aspect of the disclosure, a mounting device includes an elongated beam formed from a first material and having a first end portion, a second end portion, and a side surface extending between the first end portion and the second end portion. The mounting device further includes: a first camera mount attached to the first end portion configured to support a first camera; a second camera mount attached to the second end portion configured to support a second camera; and a bracket formed from a second material positioned between the first end portion and the second end portion for fixedly connecting the elongated beam to a vehicle. The bracket includes at least one base configured to be attached to the vehicle and a wall extending from the at least one base having an opening sized to receive the elongated beam. The side surface of the elongated beam is adhered to an inner surface of the wall by an adhesive. The adhesive includes a cured epoxy and a plurality of spacers embedded in the cured epoxy for maintaining substantially equal spacing between the side surface of the beam and the inner surface of the wall.

According to another aspect of the disclosure, a method for attaching a first camera and a second camera to a vehicle includes inserting an elongated beam of a mounting device through an opening in a wall of a bracket of the mounting device, such that a portion of the elongated beam between a first end portion and a second end portion of the elongated beam is retained in the opening. The method also includes attaching the bracket of the mounting device to the autonomous or semi-autonomous vehicle by securing one or more fasteners through openings in at least one base of the bracket to fixedly connect the bracket to the vehicle. The method also includes attaching the first camera to a first camera mount of the mounting device and the second camera to a second camera mount of the mounting device, thereby stabilizing the first camera and the second camera a fixed distance apart so that stereo images of the scene can be obtained by the first camera and the second camera.

BRIEF DESCRIPTION OF THE DRAWINGS

Additional advantages and details are explained in greater detail below with reference to the exemplary embodiments that are illustrated in the accompanying schematic figures, in which:

FIG. 3C is a front view of the mounting device of FIG. 3A;

FIG. 3D is a side view of the mounting device of FIG. 3A;

FIG. 3E is a front view of a camera mount of the mounting device of FIG. 3A;

FIG. 3J is a front view of the mounting device of FIG. 3A with cameras attached to the camera mounts;

FIG. 7 is a schematic drawing of components of a computer system that can be used with an autonomous or semi-autonomous vehicle, according to an aspect of the disclosure.

DETAILED DESCRIPTION

Figure 1A:
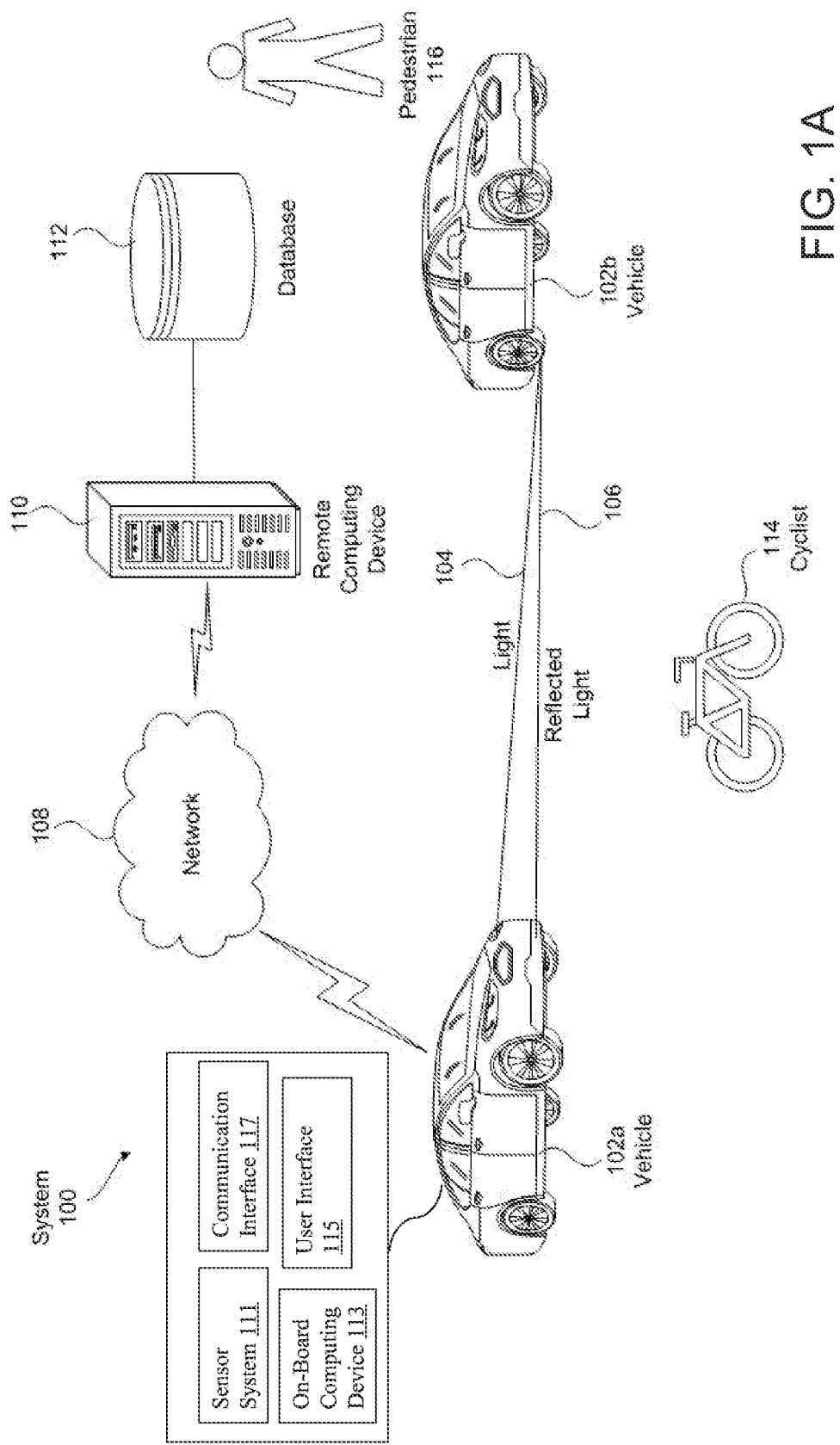
FIG. 1A is a schematic drawing of an exemplary autonomous vehicle system, according to an aspect of the present disclosure.

The following description is provided to enable those skilled in the art to make and use the described embodiments contemplated for carrying out aspects of the disclosure. Various modifications, equivalents, variations, and alternatives, however, will remain readily apparent to those skilled in the art. Any and all such modifications, variations, equivalents, and alternatives are intended to fall within the spirit and scope of the present disclosure.

For purposes of the description hereinafter, the terms "upper", "lower", "right", "left", "vertical", "horizontal", "top", "bottom", "lateral", "longitudinal", and derivatives thereof shall relate to the disclosure as it is oriented in the drawing figures. However, it is to be understood that the disclosure may assume alternative variations and step sequences, except where expressly specified to the contrary. It is also to be understood that the specific devices and processes illustrated in the attached drawings, and described in the following specification, are simply exemplary embodiments of the disclosure. Hence, specific dimensions and other physical characteristics related to the embodiments disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." As used herein, the terms "has," "have," "having," or the like are intended to be open-ended terms. Further, the phrase "based on" is intended to mean "based at least partially on" unless explicitly stated otherwise.

As used herein, the term "communication" may refer to the reception, receipt, transmission, transfer, provision, and/or the like, of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

Figure 1B:
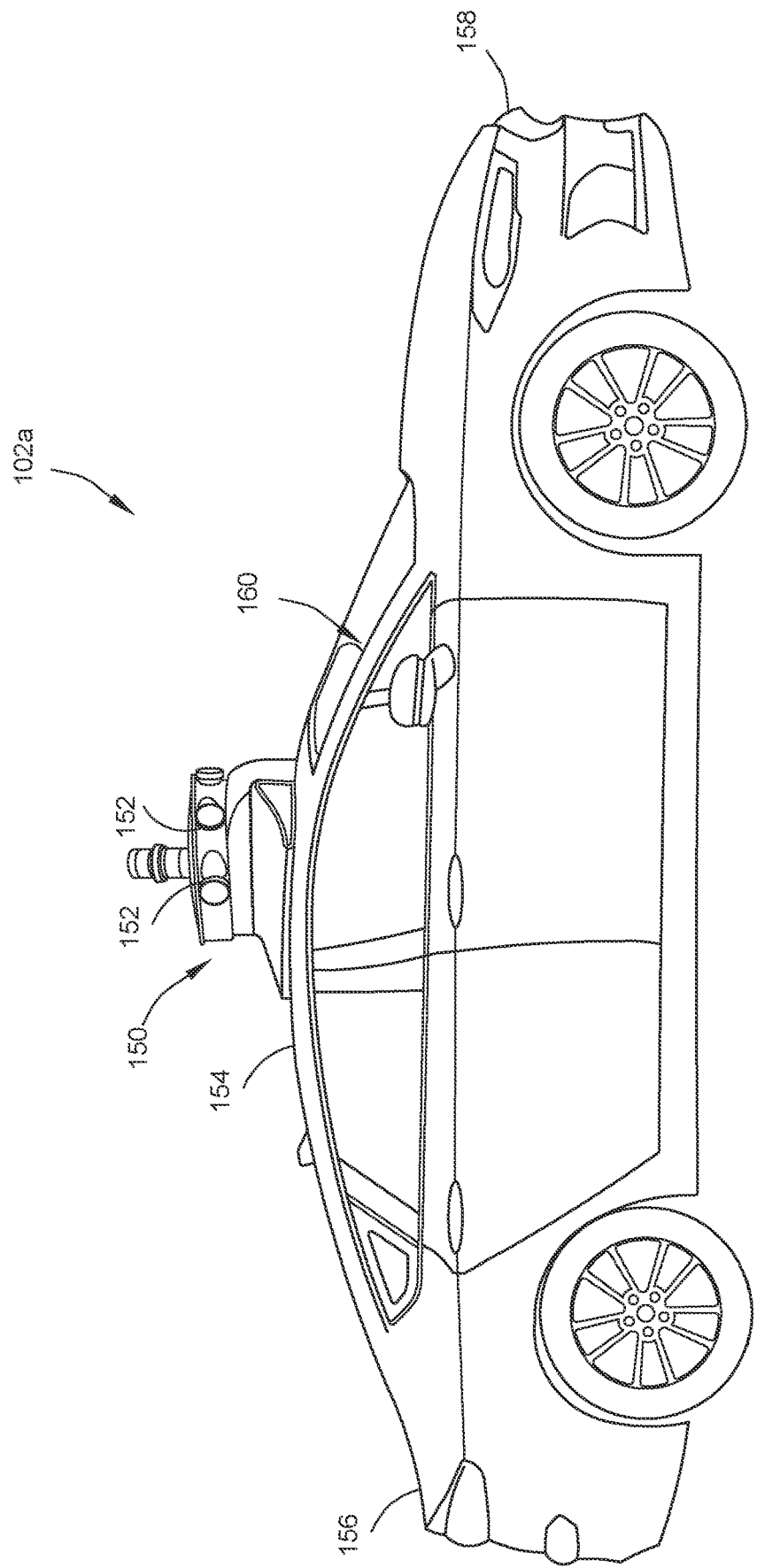
FIG. 1B is a side view of an autonomous or semi-autonomous vehicle including a sensor frame or housing on the roof of the vehicle, according to an aspect of the present disclosure.
Figure 2:
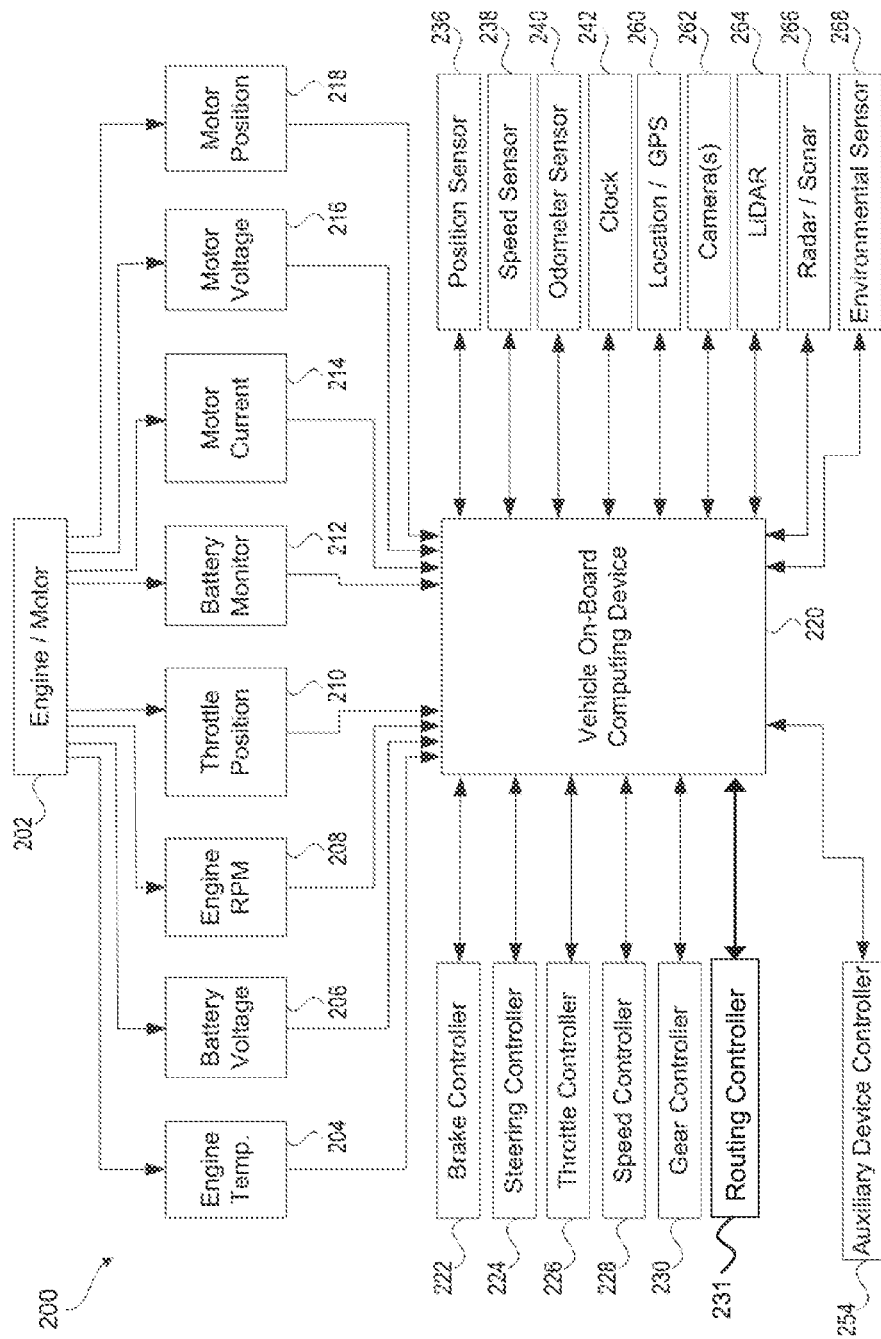
FIG. 2 is a schematic drawing illustrating exemplary system architecture for an autonomous or semi-autonomous vehicle, according to an aspect of the present disclosure.

With reference to the figures, the present disclosure is directed to a mounting device 310, 410, 610 for maintaining proper tight and rigid alignment between cameras of a vehicle 102a, such as an autonomous or semi-autonomous vehicle. The mounting device 310, 410, 610 can be secured or fixed to a portion of the exterior of the vehicle 102a, such as to a roof or another exterior portion of the vehicle 102a. As used herein, a "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, water-going vessels, boats, airplanes, helicopters, and/or aerial drones. An "autonomous vehicle" is a vehicle having a processor, programming instructions, and drivetrain components that are controllable by the processor without requiring a human operator. An autonomous vehicle may be "fully autonomous" in that it does not require a human operator for most or all driving conditions and functions, or it may be "semi-autonomous" in that a human operator may be required in certain conditions or for certain operations, or that a human operator may override the vehicle's autonomous system and may take control of the vehicle. Exemplary autonomous vehicles, which can be used with the mounting devices and image systems of the present disclosure, are shown in FIGS. 1A and 1B. A system architecture 200 for controlling the vehicle 102a is shown in FIG. 2.

The mounting device 310, 410, 610 of the present disclosure can be configured to maintain a proper alignment and spacing between two or more cameras used to obtain images that can be processed to generate a stereo image of a scene. In some examples, the mounting device 310, 410, 610 can be configured to avoid camera misalignment caused by thermal expansion of portions of the vehicle 102a or the mounting device 310, 410, 610. For example, the mounting device 310, 410, 610 can be formed from materials with a low coefficient of thermal expansion so that spacing between the cameras is maintained even as temperature changes.

Also, the mounting device 310, 410, 610 can be configured such that expansion, movement, deformation, and/or vibration of portions of the vehicle 102a, to which the mounting device 310, 410, 610 is connected, do not cause misalignment of the cameras or movement which would distort images captured by the cameras. For example, effects of thermal expansion and vibration can be minimized by reducing points of rigid or fixed contact or connection between the mounting device 310, 410, 610 and the vehicle 102a. Specifically, in some examples, the mounting device 310, 410, 610 can include only a single point of rigid contact or connection with the vehicle 102a, such as a bracket positioned at a center of the mounting device 310, 410, 610. The bracket can be positioned a substantially equal distance between a first end of the mounting device 310, 410, 610 and a second end of the mounting device 310, 410, 610. As used herein, a "point of rigid contact or connection" can refer to a portion of the mounting device 310, 410, 610 that is fixedly connected to the vehicle 102a in a manner that limits rotation and/or movement of the mounting device 310, 410, 610 relative to the vehicle 102a. In some examples, all other portions of the mounting device 310, 410, 610 can be free from rigid contact or connection with the vehicle 102a, such that the bracket forms the only point of rigid contact or connection between the mounting device 310, 410, 610 and the vehicle 102a.

The mounting devices 310, 410, 610 of the present disclosure can also be configured to absorb vibrations of the vehicle 102a or at least to limit movement of the mounting device 310, 410, 610 and the camera(s) attached thereto during normal operation of the vehicle 102a. In particular, the mounting devices 310, 410, 610 can be configured to absorb vibrations or limit vibrational movement of the mounting device 310, 410, 610 so that images, which can be used to generate the stereo images of a scene, can be captured by the cameras as the vehicle 102a travels over rough roadways, potholes, cracks, bumps, and other common roadway hazards and conditions that occur on public roadways. For example, the mounting device 310, 410, 610 can include points of flexible contact with the vehicle 102a. The points of flexible contact may allow the mounting device 310, 410, 610 to move in at least one direction relative to the vehicle 102a to account for forces caused by vehicle vibrations. The mounting device 310, 410, 610 can also include shock absorbers or dampers, such as elastomeric disks, rings, or sleeves, for absorbing movement of the mounting device 310, 410, 610 at the flexible contact points with the vehicle 102a, further limiting vibration forces from the vehicle 102a from causing misalignment of the cameras supported by the mounting device 310, 410, 610.

1. Autonomous vehicle system

FIGS. 1A and 1B illustrate an exemplary vehicle system 100 for the vehicle 102a, which may include the mounting device 310, 410, 610 of the present disclosure. In particular, as previously described, the mounting device 310, 410, 610 is configured to support optical, vision, and/or image sensors (e.g., cameras) of the vehicle 102a to maintain spacing and alignment between cameras so that stereo or three-dimensional images can be created. Improving a quality of stereo or three-dimensional images captured by the cameras improves image processing, object detection, and navigation for the vehicle 102a and vehicle systems 100.

FIG. 1A illustrates the vehicle system 100 with the vehicle 102a traveling along a road. The vehicle 102a is generally configured to detect objects in proximity to the vehicle 102a. The objects can include, but are not limited to, another vehicle 102b, a cyclist 114 (such as a rider of a bicycle, electric scooter, motorcycle, or the like) and/or a pedestrian 116. As illustrated in FIG. 1A, the vehicle 102a may include a sensor system 111, an on-board computing device 113, a communications interface 117, and a user interface 115. The vehicle 102a may further include certain components (as illustrated, for example, in FIG. 2) included in vehicles, which may be controlled by the on-board computing device 113 using a variety of communication signals and/or commands, such as, for example, acceleration signals or commands, deceleration signals or commands, steering signals or commands, and/or braking signals or commands.

The sensor system 111 may include one or more sensors that are coupled to and/or are included within the vehicle 102a, as illustrated in FIG. 2. For example, such sensors may include, without limitation, a LiDAR system, a radio detection and ranging (RADAR) system, a laser detection and ranging (LADAR) system, a sound navigation and ranging (SONAR) system, one or more cameras or vision sensors (e.g., visible spectrum cameras, such as stereo cameras, infrared cameras, etc.), temperature sensors, position sensors (e.g., global positioning system (GPS), etc.), location sensors, fuel sensors, motion sensors (e.g., inertial measurement units (IMU), etc.), humidity sensors, occupancy sensors, or the like. In some examples, the sensor system 111 can be configured to direct a laser beam or light beam 104 towards object(s) in proximity to the vehicle 102a and measure reflected light 106 reflected from the objects back towards the vehicle 102a, as shown in FIG. 1A. The sensor data can include information that describes the location of objects within the surrounding environment of the vehicle 102a, information about the environment itself, information about the motion of the vehicle 102a, information about a route of the autonomous vehicle 102, or the like. As the vehicle 102a travels over a surface, such as a roadway, at least some of the sensors may collect data pertaining to the surface. It should be noted that the LiDAR systems for collecting data pertaining to the surface may be included in systems other than the vehicle 102a such as, without limitation, other vehicles (autonomous or driven), robots, satellites, etc.

A network 108 for communication with the vehicle 102a can include one or more wired or wireless networks. For example, the network 108 may include a cellular network (e.g., a long-term evolution (LTE) network, a code division multiple access (CDMA) network, a 3G network, a 4G network, a 5G network, another type of next generation network, etc.). The network 108 may also include a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The vehicle 102a may retrieve, receive, display, and edit information generated from a local application or delivered via network 108 from a remote computing device 110 and/or database 112. For example, the database 112 may be configured to store and supply raw data, indexed data, structured data, map data, program instructions, or other data configurations.

The communications interface 117 may be configured to allow communication between the vehicle 102a and external systems, such as, for example, external devices, sensors, other vehicles, servers, data stores, and/or databases. The communications interface 117 may utilize any known or hereafter known protocols, protection schemes, encodings, formats, packaging, etc., such as, without limitation, Wi-Fi, an infrared link, Bluetooth®, etc. The user interface system 115 may be part of peripheral devices implemented within the vehicle 102a including, for example, a keyboard, a touch screen display device, a microphone, and/or a speaker.

FIG. 1B illustrates an exterior of the vehicle 102a including a sensor housing or sensor frame 150, which can be used to support components of the sensor system 111. For example, multiple cameras can be enclosed within or mounted to the sensor housing or sensor frame 150. Some of the cameras may be mounted a fixed distance apart in order to generate stereo images of a scene. The sensor frame 150 can also include other object-detection sensors for detecting objects and/or the environment surrounding the vehicle 102a.

As shown in FIG. 1B, the sensor housing or frame 150 can be positioned at any convenient location on the exterior of the vehicle 102a. For example, as shown in FIG. 1B, the sensor frame 150 is positioned on a roof 154 of the vehicle 102a. In other examples, the sensor frame 150 and/or other structures for supporting the cameras can be positioned at many other locations on either the exterior of the vehicle 102a, such as on a trunk 156 of the vehicle 102a, or proximate to a front portion or grill 158 of the vehicle 102a. In other examples, components of the sensor housing or frame 150 can be positioned inside a cabin 160 of the vehicle 102a.

In some examples, the sensor housing or frame 150 includes multiple openings or apertures 152 for the camera(s) positioned around the sensor housing or frame 150. The camera(s) and apertures 152 can be oriented in different directions to provide a panoramic view (i.e., a view of from 180 degrees to 360 degrees) of objects and/or the environment surrounding the vehicle 102a. The mounting device 310, 410, 610 of the present disclosure can be configured to be secured to the sensor housing or frame 150 for supporting cameras in fixed positions and alignment during operation of the vehicle 102a. In other examples, the mounting device 310, 410, 610 can be attached between the sensor housing or frame 150 and another portion of the exterior of the vehicle 102a, such as between the frame 150 and the roof 154 of the vehicle 102a.

2. Autonomous or Semi-Autonomous Vehicle System Architecture

FIG. 2 illustrates an exemplary system architecture 200 for vehicle 102a, such as an autonomous or semi-autonomous vehicle, in accordance with aspects of the present disclosure. It is understood, however, that other types of vehicles are considered within the scope of the technology described herein and may contain more or less elements as described in association with FIG. 2. As a non-limiting example, an airborne vehicle may exclude brake or gear controllers, but may include an altitude sensor. In another non-limiting example, a water-based vehicle may include a depth sensor. One skilled in the art will appreciate that other propulsion systems, sensors, and controllers may be included based on a type of vehicle, as is known.

As shown in FIG. 2, the system architecture 200 comprises an engine or motor 202 and various sensors 204-218 for measuring various parameters of the vehicle. In gas-powered or hybrid vehicles having a fuel-powered engine, the sensors may include, for example, an engine temperature sensor 204, a battery voltage sensor 206, an engine Rotations Per Minute ("RPM") sensor 208, and a throttle position sensor 210. If the vehicle is an electric or hybrid vehicle, then the vehicle may have an electric motor, and accordingly includes sensors, such as a battery monitoring system 212 (to measure current, voltage, and/or temperature of the battery), motor current 214 and voltage 216 sensors, and motor position sensors 218, such as resolvers and encoders.

Operational parameter sensors that are common to both types of vehicles include, for example: a position sensor 236, such as an accelerometer, gyroscope and/or inertial measurement unit; a speed sensor 238; and an odometer sensor 240. The vehicle 102a also may have a clock 242 that the system architecture 200 uses to determine vehicle time during operation. The clock 242 may be encoded into the vehicle on-board computing device 220 (which may be the same as on-board computing device 113 of FIG. 1), it may be a separate device, or multiple clocks may be available.

The vehicle also includes various sensors that operate to gather information about the environment in which the vehicle is traveling. These sensors may include, for example: a location sensor 260 (e.g., a Global Positioning System ("GPS") device); object detection sensors such as one or more vision sensors or cameras 262, such as cameras used for obtaining a stereo image of a scene; a LiDAR system 264; and/or a radar and/or a sonar system 266. The sensors also may include environmental sensors 268, such as a precipitation sensor and/or ambient temperature sensor. The object detection sensors may enable the vehicle to detect objects that are within a given distance range of the vehicle 102a in any direction, while the environmental sensors 268 collect data about environmental conditions within the vehicle's area of travel.

During operations, information is communicated from the sensors to a vehicle on-board computing device 220. The on-board computing device 220 may be implemented using a computer system, such as the computer system 700 illustrated in FIG. 7. The vehicle on-board computing device 220 analyzes the data captured by the sensors and optionally controls operations of the vehicle 102a based on results of the analysis. For example, the vehicle on-board computing device 220 may control: braking via a brake controller 222; direction via a steering controller 224; speed and acceleration via a throttle controller 226 (in a gas-powered vehicle) or a motor speed controller 228 (such as a current level controller in an electric vehicle); a differential gear controller 230 (in vehicles with transmissions); and/or other controllers. Auxiliary device controller 254 may be configured to control one or more auxiliary devices, such as testing systems, auxiliary sensors, or mobile devices transported by the vehicle 102a.

Geographic location information may be communicated from the location sensor 260 to the on-board computing device 220, which may then access a map of the environment that corresponds to the location information to determine known fixed features of the environment, such as streets, buildings, stop signs, and/or stop/go signals. Captured images from the camera(s) 262 and/or object detection information captured from sensors, such as LiDAR system 264, is communicated from those sensors to the on-board computing device 220. The object detection information and/or captured images are processed by the on-board computing device 220 to detect objects in proximity to the vehicle 102a. Any known or to be known technique for making an object detection based on sensor data and/or captured images can be used in the embodiments disclosed in this document.

LiDAR information is communicated from LiDAR system 264 to the on-board computing device 220. Additionally, captured images are communicated from the camera(s) 262 to the vehicle on-board computing device 220. The LiDAR information and/or captured images are processed by the vehicle on-board computing device 220 to detect objects in proximity to the vehicle 102a. The manner in which the object detections are made by the vehicle on-board computing device 220 includes such capabilities detailed in this disclosure.

The on-board computing device 220 may include and/or may be in communication with a routing controller 231 that generates a navigation route from a start position to a destination position for the vehicle 102a. The routing controller 231 may access a map data store to identify possible routes and road segments that a vehicle can travel on to get from the start position to the destination position. The routing controller 231 may score the possible routes and identify a preferred route to reach the destination. For example, the routing controller 231 may generate a navigation route that minimizes Euclidean distance traveled or other cost function during the route, and may further access the traffic information and/or estimates that can affect an amount of time it will take to travel on a particular route. Depending on implementation, the routing controller 231 may generate one or more routes using various routing methods, such as Dijkstra's algorithm, Bellman-Ford algorithm, or other algorithms. The routing controller 231 may also use the traffic information to generate a navigation route that reflects expected conditions of the route (e.g., current day of the week or current time of day, etc.), such that a route generated for travel during rush-hour may differ from a route generated for travel late at night. The routing controller 231 may also generate more than one navigation route to a destination and send more than one of these navigation routes to a user for selection by the user from among various possible routes.

In various examples, the on-board computing device 220 may determine perception information of the surrounding environment of the vehicle 102a. Based on the sensor data provided by one or more sensors and location information that is obtained, the on-board computing device 220 may determine perception information of the surrounding environment of the vehicle 102a. The perception information may represent what an ordinary driver would perceive in the surrounding environment of the vehicle 102a. The perception data may include information relating to one or more objects in the environment of the vehicle 102a. For example, the on-board computing device 220 may process sensor data (e.g., LiDAR or RADAR data, camera images, etc.) in order to identify objects and/or features in the environment of the vehicle 102a. The objects may include traffic signals, road way boundaries, other vehicles, pedestrians, and/or obstacles, etc. The on-board computing device 220 may use any known or hereafter known object recognition algorithms, video tracking algorithms, and computer vision algorithms (e.g., track objects frame-to-frame iteratively over a number of time periods) to determine the perception.

In some examples, the on-board computing device 220 may also determine, for one or more identified objects in the environment, the current state of the object. The state information may include, without limitation, for each object: current location; current speed and/or acceleration, current heading; current pose; current shape, size, or footprint; type (e.g., vehicle vs. pedestrian vs. bicycle vs. static object or obstacle); and/or other state information.

The on-board computing device 220 may perform one or more prediction and/or forecasting operations. For example, the on-board computing device 220 may predict future locations, trajectories, and/or actions of one or more objects. For example, the on-board computing device 220 may predict the future locations, trajectories, and/or actions of the objects based at least in part on perception information (e.g., the state data for each object comprising an estimated shape and pose determined as discussed below), location information, sensor data, and/or any other data that describes the past and/or current state of the objects, the vehicle 102a, the surrounding environment, and/or their relationship(s). For example, if an object is a vehicle and the current driving environment includes an intersection, the on-board computing device 220 may predict whether the object will likely move straight forward or make a turn. If the perception data indicates that the intersection has no traffic light, the on-board computing device 220 may also predict whether the vehicle may have to fully stop prior to enter the intersection.

In various embodiments, the on-board computing device 220 may determine a motion plan for the vehicle 102a. For example, the on-board computing device 220 may determine a motion plan for the vehicle 102a based on the perception data and/or the prediction data. Specifically, given predictions about the future locations of proximate objects and other perception data, the on-board computing device 220 can determine a motion plan for the vehicle 102a that best navigates the vehicle 102a relative to the objects at their future locations.

In some examples, the on-board computing device 220 may receive predictions and make a decision regarding how to handle objects and/or actors in the environment of the vehicle 102a. For example, for a particular actor (e.g., a vehicle with a given speed, direction, turning angle, etc.), the on-board computing device 220 decides whether to overtake, yield, stop, and/or pass based on, for example, traffic conditions, map data, state of the autonomous vehicle, etc. Furthermore, the on-board computing device 220 also plans a path for the vehicle 102a to travel on a given route, as well as driving parameters (e.g., distance, speed, and/or turning angle). That is, for a given object, the on-board computing device 220 decides what to do with the object and determines how to do it. For example, for a given object, the on-board computing device 220 may decide to pass the object and may determine whether to pass on the left side or right side of the object (including motion parameters such as speed). The on-board computing device 220 may also assess the risk of a collision between a detected object and the vehicle 102a. If the risk exceeds an acceptable threshold, it may determine whether the collision can be avoided if the vehicle 102a follows a defined vehicle trajectory and/or implements one or more dynamically generated emergency maneuvers performed in a pre-defined time period (e.g., N milliseconds). If the collision can be avoided, then the on-board computing device 220 may execute one or more control instructions to perform a cautious maneuver (e.g., mildly slow down, accelerate, change lane, or swerve). In contrast, if the collision cannot be avoided, then the on-board computing device 220 may execute one or more control instructions for execution of an emergency maneuver (e.g., brake and/or change direction of travel).

As discussed above, planning and control data regarding the movement of the vehicle 102a is generated for execution. The on-board computing device 220 may, for example, control braking via a brake controller 222; direction via a steering controller 224; speed and acceleration via a throttle controller 226 (in a gas-powered vehicle) or a motor speed controller 228 (such as a current level controller in an electric vehicle); a differential gear controller 230 (in vehicles with transmissions); and/or other controllers.

3. Mounting Device for Camera Alignment

Figure 3A:
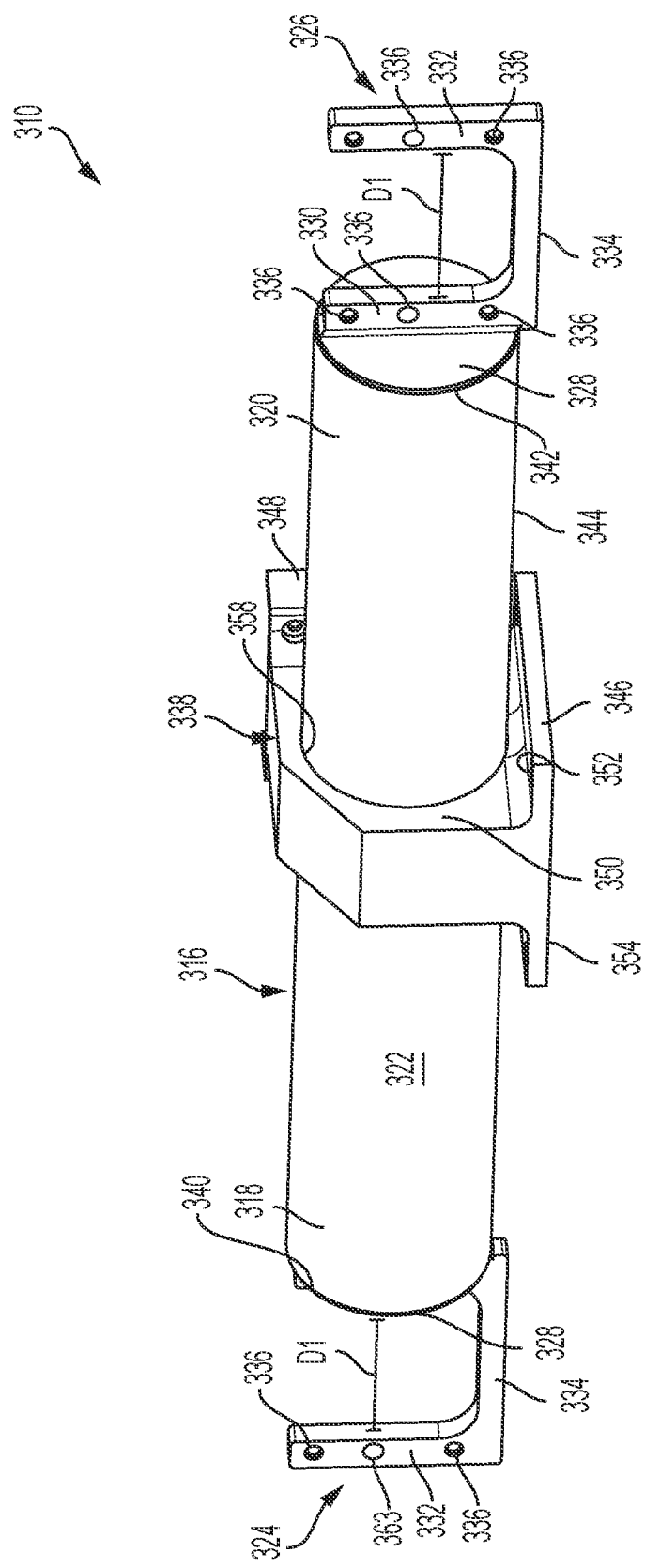
FIG. 3A is a perspective view of a front portion of a mounting device for alignment of cameras, according to an aspect of the disclosure.
Figure 3B:
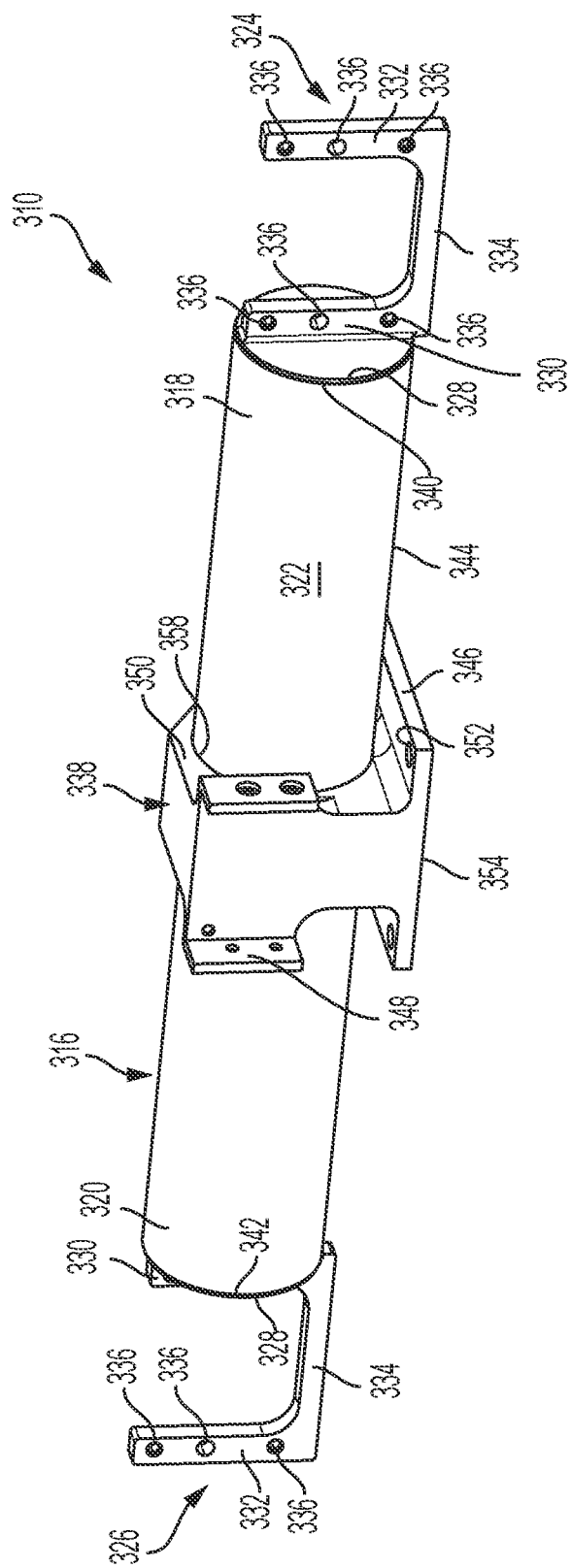
FIG. 3B is a perspective view of a rear portion of the mounting device of FIG. 3A.

FIGS. 3A-3E illustrate an exemplary mounting device 310 configured to be secured to the exterior of the vehicle 102a for supporting cameras, which may be the camera(s) discussed above in connection with the sensor system 111 or system architecture 200. FIG. 3A is a perspective view of a front portion of the mounting device 310. FIG. 3B is a perspective view of a rear portion of the mounting device 310. FIG. 3C is a front view of the mounting device 310. FIG. 3D is a side view of the mounting device 310. FIG. 3E is a front view of a camera mount 324, 326 of the mounting device 310. The mounting device 310 can be secured to the roof 154 of the vehicle 102a and/or to the sensor housing or frame 150. The mounting device 310 can be configured to support a first camera 312 and a second camera 314 (shown in FIG. 3J) to maintain fixed and rigid alignment between the cameras 312, 314 to capture images that can be used to generate the stereo images of a scene.

Figure 3F:
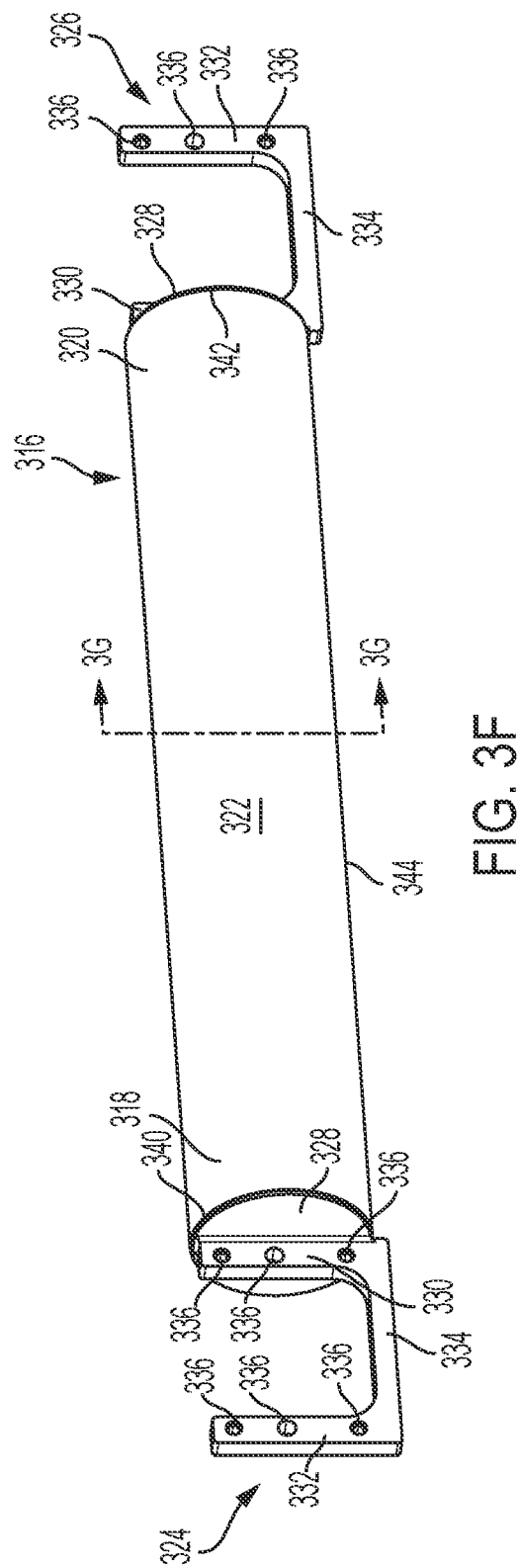
FIG. 3F is a perspective view of an elongated beam of the mounting device of FIG. 3A.
Figure 3G:
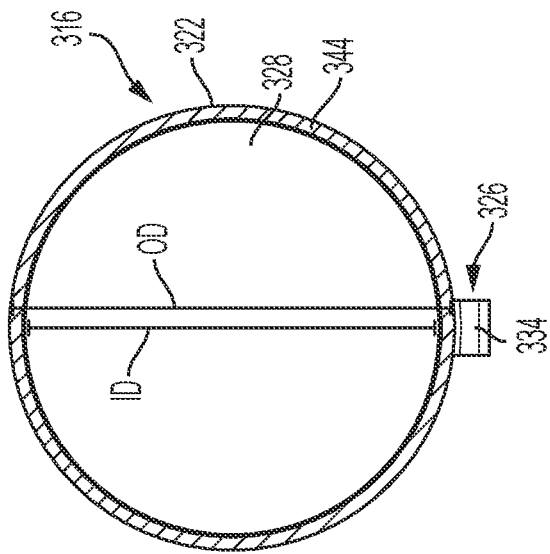
FIG. 3G is a cross-sectional view of the elongated beam of FIG. 3F taken along line 3G.

The mounting device 310 comprises an elongated beam 316 for maintaining the proper spacing and alignment between the first camera 312 and the second camera 314. FIGS. 3F and 3G show the elongated beam 316 separated from other components of the mounting device 310. Specifically, FIG. 3F is a perspective view of the elongated beam 316 of the mounting device 310. FIG. 3G is a cross-sectional view of the elongated beam 316 of the mounting device 310 taken along line 3G of FIG. 3F.

With specific reference to FIGS. 3A-3E, the elongated beam 316 includes a first end portion 318, a second end portion 320, and a side surface 322 extending between the first end portion 318 and the second end portion 320. As used herein, a "beam" refers to a substantially rigid elongated member that does not deform or bend when exposed to normal or anticipated forces. For example, the elongated beam 316 of the present disclosure can be sufficiently rigid to avoid bending or flexing when exposed to forces caused by vibration of portions of the vehicle 102a as the vehicle 102a drives on a road. The elongated beam 316 can have a circular shaped cross-section or other regular or irregular cross section shapes, such as a square, rectangle, oval, or I-beam shape. In some examples, as described in further detail herein, the elongated beam 316 can be hollow, such as a hollow tube having cylindrical inner and outer surfaces. The elongated beam 316 is formed from a rigid material with low thermal expansion so that cameras mounted to the elongated beam 316 do not become misaligned when the elongated beam 316 is exposed to high or low temperatures. In particular, the elongated beam 316 desirably does not substantially expand or contract when exposed to normal or expected temperatures to which the vehicle 102a may be exposed during normal use. For example, the elongated beam 316 may be configured to avoid expansion or contract when exposed to temperatures from varying extreme weather conditions (e.g., −35° F. to 122° F. (about −35° C. to 50° C.)). In some examples, the elongated beam 316 comprises carbon fiber. For example, the elongated beam 316 can be a carbon fiber tube produced by rolling, protrusion, or other common manufacturing methods.

The mounting device 310 further comprises a first camera mount 324 on the first end portion 318 of the elongated beam and a second camera mount 326 on the second end portion 320 of the elongated beam 316. In some examples, the camera mounts 324, 326 can be integrally formed with the elongated beam 316. For example, the elongated beam 316 can be molded or formed with camera mounts 324, 326 extending from the first end portion 318 and/or the second end portion 320 of the elongated beam 316. Alternatively, the camera mounts 324, 326 can be separate structures that are secured to the first end portion 318 and/or the second end portion 320 of the elongated beam 316 by adhesives, fasteners, clips, clamps, or other connectors as are known in the art. For example, as shown in FIG. 3E, the camera mounts 324, 326 can include a cylindrical connector portion 328 configured to be inserted in an open end of the tubular elongated beam 316. The camera mounts 324, 326 can also include a flat, u-shaped supporting structure extending from the connector portion 328. For example, the supporting structure can include a first side portion 330 proximate to the connector portion 328, a second side portion 332 spaced apart from the connector portion 328, and a lower side portion 334 extending between the first side portion 330 and the second side portion 332. The side portions 330, 332, 334 form a gap or receiving space having a width D1 sized to receive cameras, such as the cameras 312, 314 shown in FIG. 3J. The side portions 330, 332 can include openings 336 or through holes for securing one of the cameras 312, 314 to the camera mounts 324, 326. For example, each side portion 330, 332 can include three vertically aligned openings 336 for securing one of the cameras 312, 314 to the camera mount 324, 326. The camera mounts 324, 326 can be formed from any convenient material that can be manufactured, machined, or molded to a desired final shape. For example, the camera mounts 324, 326 can be formed from metal, such as aluminum. The camera mounts 324, 326 can also include various other configurations of clips, clamps, connectors, or anchors as are known in the art depending upon the type of camera being used with the mounting device 310.

Figure 3I:
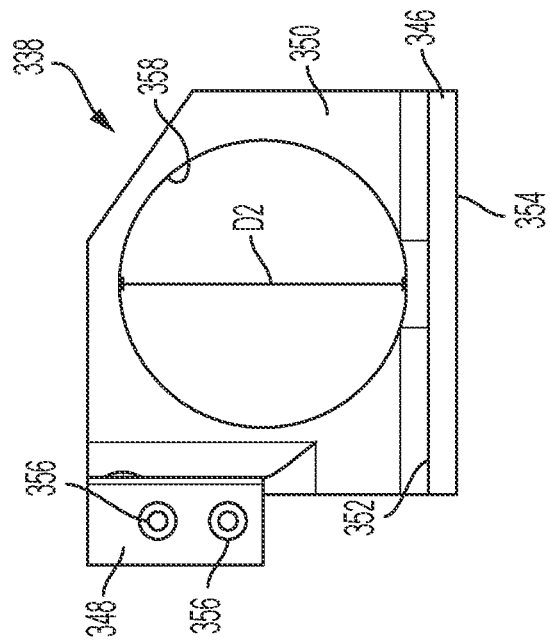
FIG. 3I is a side view of the bracket of FIG. 3H.
Figure 3H:
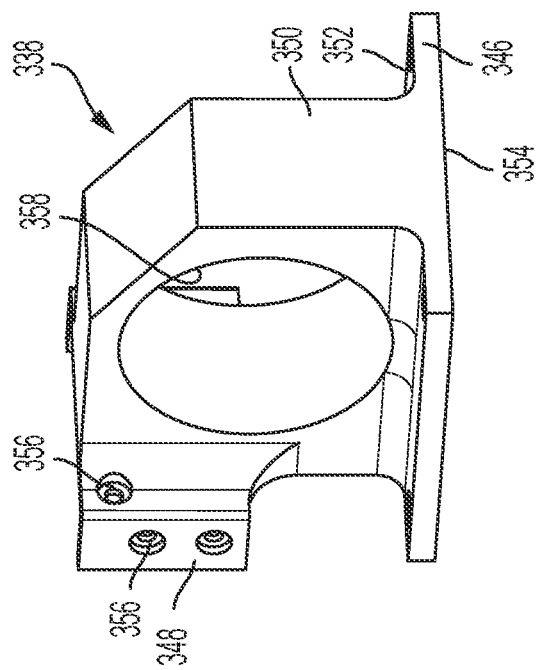
FIG. 3H is a perspective view of a bracket of the mounting device of FIG. 3A.

With specific reference to FIGS. 3A-3C, as well as FIGS. 3H and 3I, the mounting device 310 further comprises a bracket 338 positioned between the first end portion 318 and the second end portion 320 of the elongated beam 316. FIGS. 3H and 3I show the bracket 338 separated from other portions of the mounting device 310. Specifically, FIG. 3H is a perspective view of the bracket 338 of the mounting device 310. FIG. 3I is a side view of the bracket 338 of the mounting device 310. In some examples, the bracket 338 is configured to fixedly or rigidly connect the elongated beam 316 to a portion of a vehicle, such as the vehicle 102a shown in FIGS. 1A and 1B. For example, the bracket 338 can be configured to secure the elongated beam 316 to an exterior portion or panel of the vehicle 102a, such as to the roof 154 of the vehicle 102a. The bracket 338 is configured to restrict rotation of the elongated beam 316 about multiple axes, such as restricting rotation in a pitch direction (shown by arrow A1 in FIG. 3C) and a yaw direction (shown by arrow A2 in FIG. 3C) by a predetermined angular distance. For example, the bracket 338 can be configured to restrict rotation of the elongated beam 316 to a maximum pitch and maximum yaw of 0.5 milliradians (mrad). The bracket 338 can also be configured to restrict axial rotation (shown by arrow A3 in FIG. 3C) of the elongated beam 316 to ensure that a field-of-view of cameras, such as the cameras 312, 314 shown in FIG. 3J, is aimed in a correct or desired direction.

With specific reference to FIGS. 3F and 3G, as well as FIGS. 3A-3E, the elongated beam 316 of the mounting bracket 310 can be a tube, such as a cylindrical tube, comprising a first open end 340, a second open end 342, and a sidewall 344 extending therebetween. A cylindrical tube may be preferred because cylindrical tubes are often easier to produce using common carbon fiber processing methods than beams, elongated members, or tubes with other cross-sectional shapes. In other examples, as previously described, the elongated beam 316 or tube may have other cross-sectional shapes, such as a square, rectangle, oval, or I-beam shape.

A length of the elongated beam 316 is determined based on how far apart the cameras, such as cameras 312, 314, need to be for the types of stereo images being captured and may depend, for example, on a resolution, aperture size, or field-of-view dimensions of the cameras. For example, the elongated beam 316 can have an axial length L1 (shown in FIG. 3C) of from about 440 mm to about 540 mm. The elongated beam 316 can have an outer diameter OD of about 60 mm to 100 mm and an inner diameter ID of about 54 mm to 96 mm (shown in FIG. 3G). A thickness of the beam 316 can be selected in order to ensure that a moment of inertia of the beam 316 is sufficient so that the beam 316 does not rotate due to vibration forces or the weight of the cameras 312, 314 or camera mounts 324, 326. The beam 316 should also be sufficiently thick so that the beam 316 does not deform, bend, or flex when exposed to expected or anticipated forces from the vehicle 102a. For example, a thickness of the beam 316 can be from about 2.0 mm to about 3.0 mm.

As previously described, the camera mounts 324, 326 can be connected to the open first end 340 and the open second end 342 of the elongated beam 316. For example, the cylindrical connectors 328 of the camera mounts 324, 326 can be inserted into the open ends 340, 342 of the tubular elongated beam 316. In order to ensure proper fit, the cylindrical connector 328 can have an outer diameter that substantially matches the inner diameter ID of the elongated beam 316 so that the connector portion 328 can be fixedly and firmly secured to the elongated beam 316. The cylindrical connector portion 328 can be adhered to the inner surface of the elongated beam 316 by adhesives, welds, and/or mechanical fasteners as are known in the art.

As previously described, the elongated beam 316 is configured to be connected to the bracket 338 for securing the elongated beam 316 and cameras, such as the cameras 312, 314, to the vehicle 102a. The bracket 338 can be a molded structure formed from metal. In some examples, the bracket 338 can be formed from the same material as the material that forms the portion of the vehicle 102a to which the bracket 338 is mounted and can have similar or identical thermal expansion properties as the portion of the vehicle 102a to which the bracket 338 is mounted. In some examples, the exterior of the vehicle 102a and the bracket 338 are formed from aluminum and/or from an aluminum alloy, which has a coefficient of thermal expansion of about 25.5° C.$^{-1}$. As previously described, the elongated beam 316 is formed from a material, such as carbon fiber, having a low coefficient of thermal expansion, so that the length L1 of the beam 316 and distance between the camera mounts 324, 326 does not change as temperature of the elongated beam 316 increases. The coefficient of thermal expansion for carbon fiber is generally assumed to be near to zero.

With reference to FIGS. 3A-3D, as well as FIGS. 3H and 3I, the bracket 338 can include one or more bases 346, 348, base portions, or connecting structures configured to be attached to the vehicle 102a, and a wall 350 extending from the one or more bases 346, 348 for supporting the elongated beam 316. For example, the bracket 338 can include a first or bottom base 346, such as a flat rigid plate, including a top surface 352 and a bottom surface 354 configured to be in contact with the exterior of the vehicle 102a. The wall 350 can extend substantially vertically from the top surface 352 of the bottom base 346 in an upwards direction. For example, the wall 350 can extend perpendicularly from the top surface 352 of the bottom base 346, as shown in FIGS. 3H and 3I. The bracket 338 can also include a second or side base 348, such as a plate, clamp, connector or bracket, extending from a side or peripheral edge of the wall 350. The bottom base 346 and the side base 348 can include openings 356 or through holes extending through the bases 346, 348 sized to receive fasteners, such as bolts, screws, nails, or posts, for securing the bottom base 346 and the side base 348 to the vehicle 102a. For example, the bottom base 346 can include multiple openings 356 or through holes for receiving vertically arranged fasteners to secure the bottom base 346 to an exterior panel of the vehicle 102a, such as to the roof 154 of the vehicle 102a. The side base 348 can include a rectangular bracket or connector with openings 356 or through holes configured to receive horizontally oriented fasteners for securing the side base 348 to a rectangular beam of the sensor frame 150 of the vehicle 102a.

The wall 350 of the bracket 338 is configured to receive the elongated beam 316 and to maintain positioning of the elongated beam 316 and cameras, such as the cameras 312, 314 shown in FIG. 3J, so that images for generating the stereo images can be obtained from the cameras. For example, the wall 350 can include an opening 358 sized to receive a central portion of the elongated beam 316. For a tubular elongated beam 316, as shown in FIGS. 3A-3G, the opening 358 through the wall 350 is a circle having a diameter D2 (shown in FIG. 3I), which corresponds with the outer diameter OD of the elongated beam 316. For example, the diameter D2 of the opening 358 can be about 60 mm to about 100 mm. The elongated beam 316 can be fixedly secured to the opening 358 through the wall 350 by an adhesive, such as a curable epoxy. Many different commercially-available curable epoxy materials from different manufacturers can be used for securing the elongated beam 316 to the wall 350 of the bracket 338. For example, suitable epoxy adhesives that can be used with the mounting device 310 of the present disclosure are manufactured by Olin Corporation, Huntsman Corporation, Dow Inc., and others. In some examples, the adhesive includes or is mixed with spacers, such as glass beads. The spacers, such as the glass beads, are provided to maintain spacing between the outer surface of the elongated beam 316 and the inner surface of the opening 358 of the wall 350. Maintaining spacing between the elongated beam 316 and the wall 350 ensures that the elongated beam 316 is appropriately positioned in the opening 358 of the wall 350 with the adhesive well distributed around the elongated beam 316.

Dimensions of the wall 350 are selected to ensure that the elongated beam 316 is held securely to restrict movement and rotation of the elongated beam 316 relative to the bracket 338. However, as previously described, an area of contact between the elongated beam 316 and the wall 350 of the bracket 338 is also intended to be as small as possible to limit effects of thermal expansion of the vehicle 102a and/or bracket 338. For example, the wall 350 can be from about 40 mm to about 60 mm or, preferably about 50 mm, thick in order to properly support the elongated beam 316, while avoiding problems caused by the thermal expansion of the vehicle 102a and bracket 338.

Figure 4A:
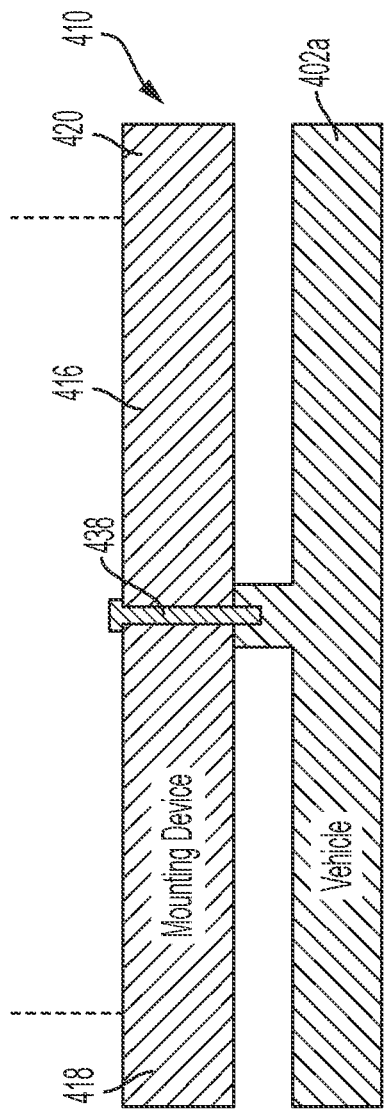
FIG. 4A is a schematic drawing of a mounting device for alignment of cameras attached to a vehicle, according to an aspect of the present disclosure.
Figure 4B:
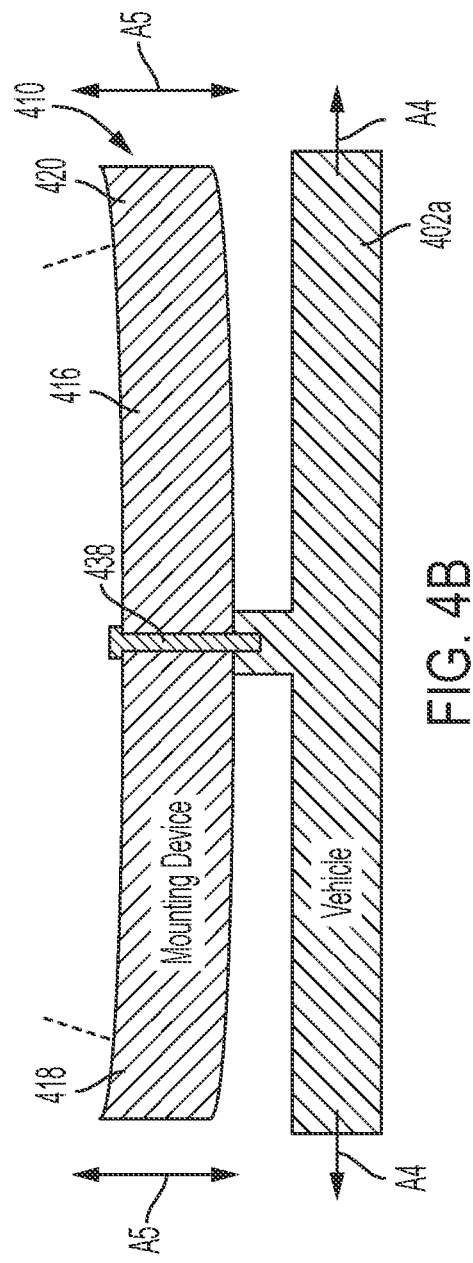
FIG. 4B is a schematic drawing of the mounting device of FIG. 4A when exposed to thermal expansion and/or vibration forces.

FIGS. 4A and 4B illustrate effects of thermal expansion and vibration forces on a mounting device 410, which can be similar or identical to the previously described mounting device 310 shown in FIGS. 3A-3E. Specifically, FIG. 4A shows the mounting device 410 with a bracket 438 connected to a vehicle 402a, such as an autonomous or semi-autonomous vehicle, at a single rigid contact or connection point at the center of the mounting device 410 and without thermal expansion forces or vibration forces. By contrast, FIG. 4B shows the mounting device 410 and bracket 438 when thermal expansion forces and vibration forces are applied to the mounting device 410.

As shown in FIG. 4B, thermal expansion forces may cause portions of the vehicle 402a and bracket 438 to expand, as shown by arrows A4. However, due to the lower coefficient of thermal expansion of the elongated beam 416, the elongated beam 416 does not substantially expand. If the mounting device 410 were attached to the vehicle 402a at multiple rigid or fixed contact or connection points, the thermal expansion of the vehicle 402a would cause the different contact points between the vehicle 402a and the mounting device 410 to move away from each other exerting axial forces on the elongated beam 416 potentially causing misalignment of cameras positioned on the ends of the beam 416. However, because the mounting device 410 is only attached to the vehicle 402a through a single rigid contact or connection point at the central bracket 438 and because the area of contact between the bracket 438 and the elongated beam 416 is as small as possible, the thermal expansion of portions of the vehicle 402a is not transferred to the mounting device 410. Accordingly, the mounting device 410, which is only attached to the vehicle 402a at the single rigid contact or connection point, substantially preserves alignment of the cameras by preventing thermal expansion of the vehicle 402a from exerting forces on the elongated beam 416.

The mounting device 410 in FIG. 4B is also exposed to vibrations. The vibrations can cause ends of the elongated beam 416 of the mounting device 410 to move vertically, as shown by arrows A5 in FIG. 4B. However, a distance between cameras mounted at opposite ends of the elongated beam 416 desirably remains substantially constant meaning that alignment of the cameras is generally preserved.

Figure 4C:
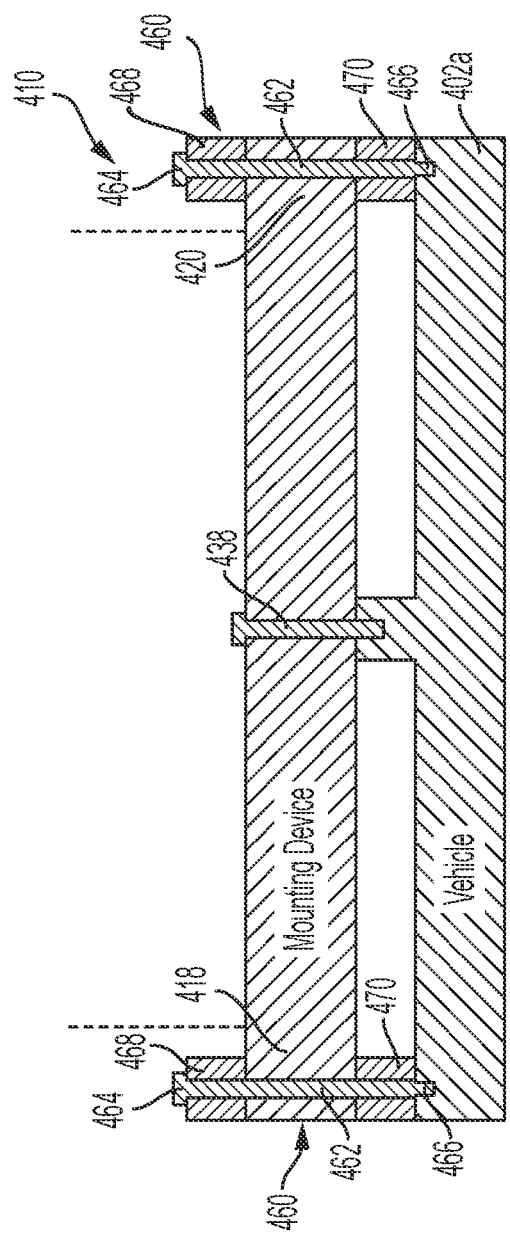
FIG. 4C is a schematic drawing showing an example of a mounting device for alignment of cameras including vibration damper assemblies, according to an aspect of the present disclosure.
Figure 4D:
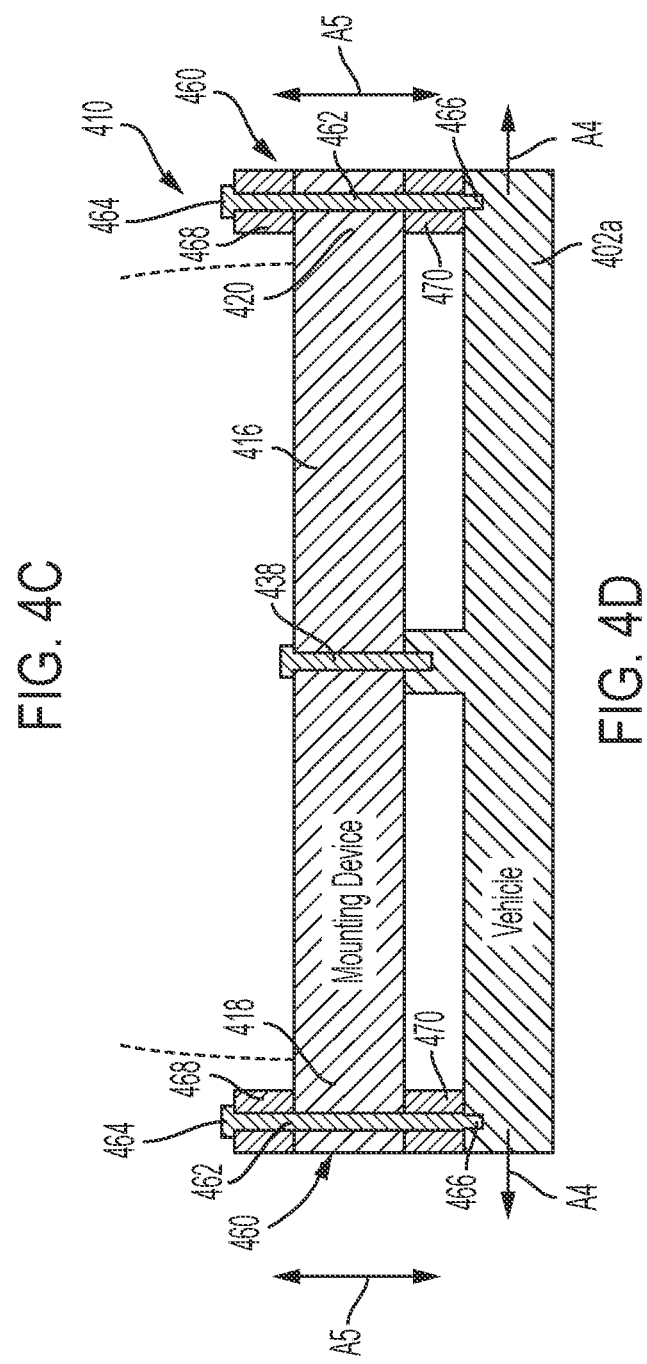
FIG. 4D is a schematic drawing of the mounting device of FIG. 4C when exposed to thermal expansion and/or vibration forces.

With reference to FIGS. 4C and 4D, as previously described, in some examples, the mounting device 410 includes areas of flexible or movable contact between the mounting device 410 and the vehicle 402a. For example, as shown in FIGS. 4C and 4D, the mounting device 410 can include vibration dampers or vibration damper assemblies 460 positioned, for example, between a first end portion 418 and a second end portion 420 of the elongated beam 416 and the vehicle 402a. The vibration damper assemblies 460 can include a fastening member 462, such as a post or bolt, extending through the elongated beam 416. The fastening member 462 can include a top end including a head portion 464 or flange and a bottom end 466 that engages the vehicle 402a for securing the fastening member 462 to the vehicle 402a. As shown in FIGS. 4C and 4D, the fastening members 462 extend through openings or holes in the elongated beam 416. The elongated beam 416 can be configured to move or slide along the fastening members 462 so that thermal expansion and vibration forces from the vehicle 402a are not exerted on the elongated beam 416.

The vibration assemblies 460 further include the vibration dampers, such as sleeves 468, 470, which are secured or connected to the fastening members 462 and surround the fastening members 462. In particular, vibration dampers, such as the sleeves 468, 470, can be secured to the mounting device 410 and vehicle 402a under compression in order to absorb vibrations exerted by the vehicle 402a to the mounting device 410. The sleeves 468, 470 can be formed from synthetic or natural elastomeric materials (e.g., polypropylene, polyethylene, silicone, synthetic rubber, or natural rubber (e.g., isoprene)), and can include an opening that receives the fastening member 462. In some examples, as shown in FIGS. 4C and 4D, the vibration damper assemblies 460 can include upper elastomeric sleeves 468 positioned between the head portion 464 of the fastening members 462 and the outer surface of the elongated beam 416, and lower elastomeric sleeves 470 positioned between the outer surface of the elongated beam 416 and the vehicle 402a. The sleeves 468, 470 are positioned to absorb vibration forces exerted on the elongated beam 416 preventing the elongated beam 416 from moving up and down relative to the fastening members 462 and/or vehicle 402a.

FIG. 4C shows the mounting device 410 and the vehicle 402a before thermal expansion forces or vibration forces are applied to the mounting device 410. In FIG. 4D, thermal expansion forces (shown by arrow A4 in FIG. 4D) and vibration forces (shown by arrow A5 in FIG. 4D) are being exerted on the mounting device 410. As previously described, the mounting device 410 is secured to the vehicle 402a by the bracket 438, which is a single point of rigid contact or connection between the mounting device 410 and the vehicle 402a. The mounting device 410 is also flexibly connected to the vehicle 402a by the vibration damper assemblies 460 at the first and second end portions 418, 420 of the elongated beam 416. Because the elongated beam 416 is not fixed to the fastening members 462 of the vibration damper assemblies 460, the beam 416 is free to move relative to the fastening members 462, which reduces effects of thermal expansion of the vehicle 402a and bracket 438. In FIG. 4D, the mounting device 410 is also exposed to vibration forces. However, unlike in FIG. 4B in which end portions 418, 420 of the elongated beam 416 moved vertically (shown by arrow A5 in FIG. 4B), the elongated beam in FIG. 4D remains substantially stationary because any vertical forces exerted on the elongated beam 416 are absorbed by the elastomeric sleeves 468, 470 of the vibration damper assemblies 460 connected to the end portions 418, 420 of the elongated beam 416.

4. Assembly Method for a Mounting Device

Figure 5:
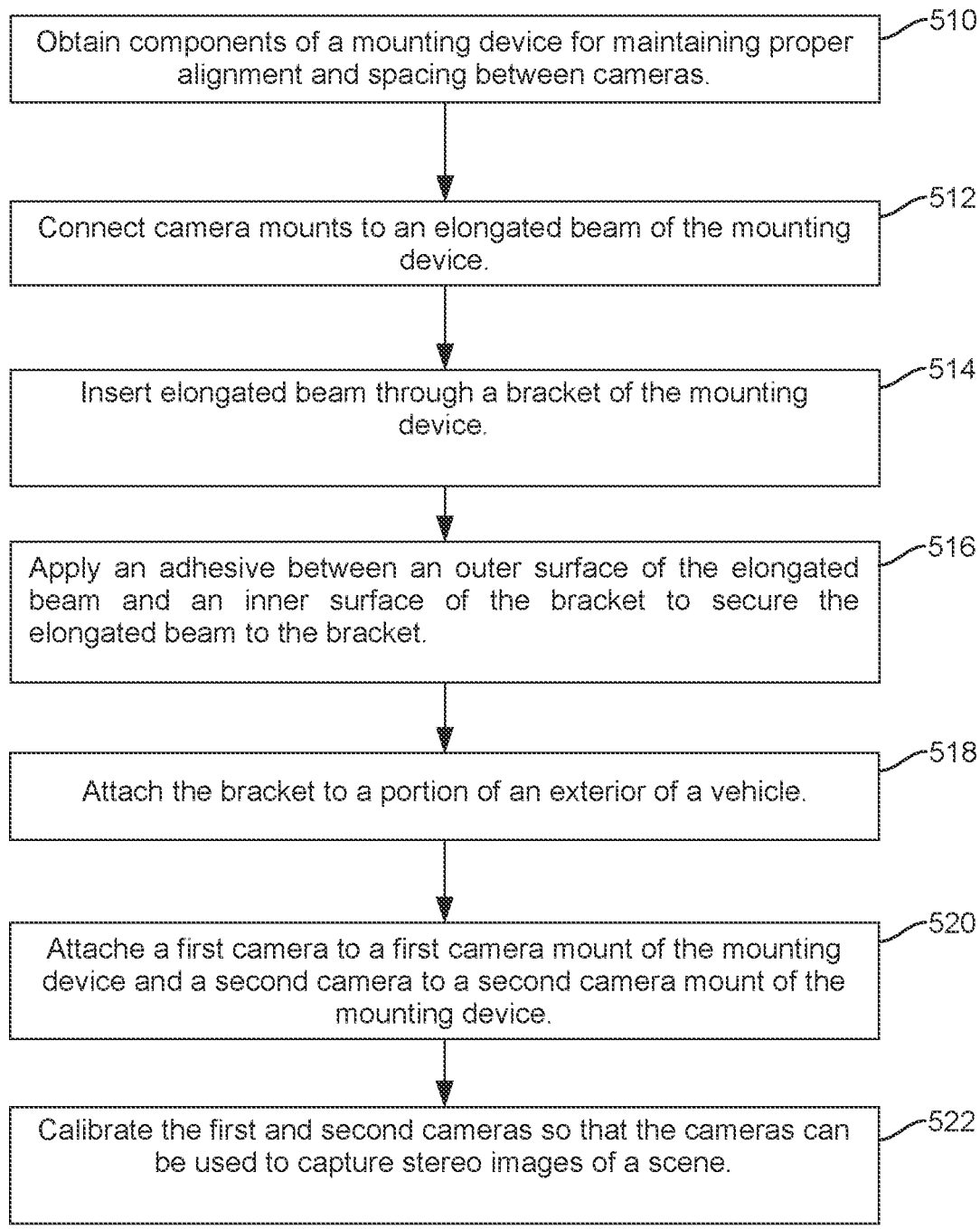
FIG. 5 is a flow chart showing steps for assembling a mounting device for alignment of cameras on a vehicle, according to an aspect of the disclosure.

FIG. 5 shows a flow chart including steps for assembling a mounting device, such as the previously described mounting device 310, and for securing the mounting device to a vehicle 102a (shown in FIGS. 1A and 1B), such as an autonomous or semi-autonomous vehicle. At step 510, an installer, such as a manufacturer, vehicle technician, or mechanic, obtains components of the mounting device 310. At step 512, the installer connects the cameras mount 324, 326 to the elongated beam 316. For example, the installer may insert the connection portions 328 of the camera mounts 324, 326 through the open ends 340, 342 of the beam 316. The connection portions 328 may be secured in the beam 316 by an adhesive or fasteners. Once the camera mounts 324, 326 are in place, at step 514, the installer inserts the elongated beam 316 of the mounting device 310 through the opening 358 in the wall 350 of the bracket 338, such that a portion of the elongated beam 316 between the first end portion 318 and the second end portion 320 of the elongated beam 316 is retained in the opening 358 of the wall 350. For example, as previously described, the bracket 338 can be positioned at a center of the elongated beam 316 so that the beam 316 and cameras, such as the cameras 312, 314, connected thereto are balanced about or relative to the central bracket 338.

At step 516, in some examples, the installer can apply an adhesive, such as a curable epoxy resin, between an outer surface of the elongated beam 316 and an inner surface of the wall 350 of the bracket 338. For example, the installer may dispense flowable adhesive to a gap between the outer surface of the beam 316 and the wall 350 from a suitable container or packaging. Once the adhesive cures, the adhesive fixes the bracket 338 at the central position on the elongated beam 316.

At step 518, once the beam 316 is secured to the bracket 338, the installer attaches the bracket 338 of the mounting device 310 to a vehicle, such as the vehicle 102a shown in FIGS. 1A and 1B, by securing one or more fasteners through openings in the bases 346, 348 of the bracket 338 to fixedly connect the bracket 338 to a portion of the vehicle 102a. For example, as previously described, the bottom base 346 can be positioned in contact with a panel of the vehicle 102a, such as the vehicle roof 154 shown in FIG. 1B. The side base 348 can be secured to a portion of the sensor frame 150 shown in FIG. 1B. For example, the side base 348 can be secured to a rectangular beam or connector of the sensor housing or frame 150.

At step 520, the installer can also attach the cameras 312, 314 to the camera mount 324, 326 by, for example, inserting fasteners, such as bolts or screws, through the openings 336 on the side portions 330, 332 of the camera mounts 324, 326. The installer may also attach various power and/or data transmission wires or cables to the cameras 312, 314 to provide power for the cameras 312, 314 and to place the cameras 612, 614 in communication with control and/or data processing and collection systems of the vehicle 102a. The above steps need not be performed in the order recited above. For example, step 518 (attaching the bracket to the vehicle) can occur before step 512. By way of further example, step 512 can follow step 514 and/or step 516.

At step 522, once the cameras 312, 314 are secured to the camera mount 324, 326, the cameras 312, 314 can be calibrated in order to prepare the cameras 312, 314 for use. As previously described, the mounting device 310 is configured to stabilize and maintain alignment between the cameras 312, 314 so that stereo images of the scene can be obtained by the cameras 312, 314. Therefore, it is expected that the cameras 312, 314 will not need to be recalibrated often because the mounting device 310 maintains the fixed distance between and proper alignment of the cameras 312, 314.

5. Stereo Image Generation System and Computer Control System

Figure 6:
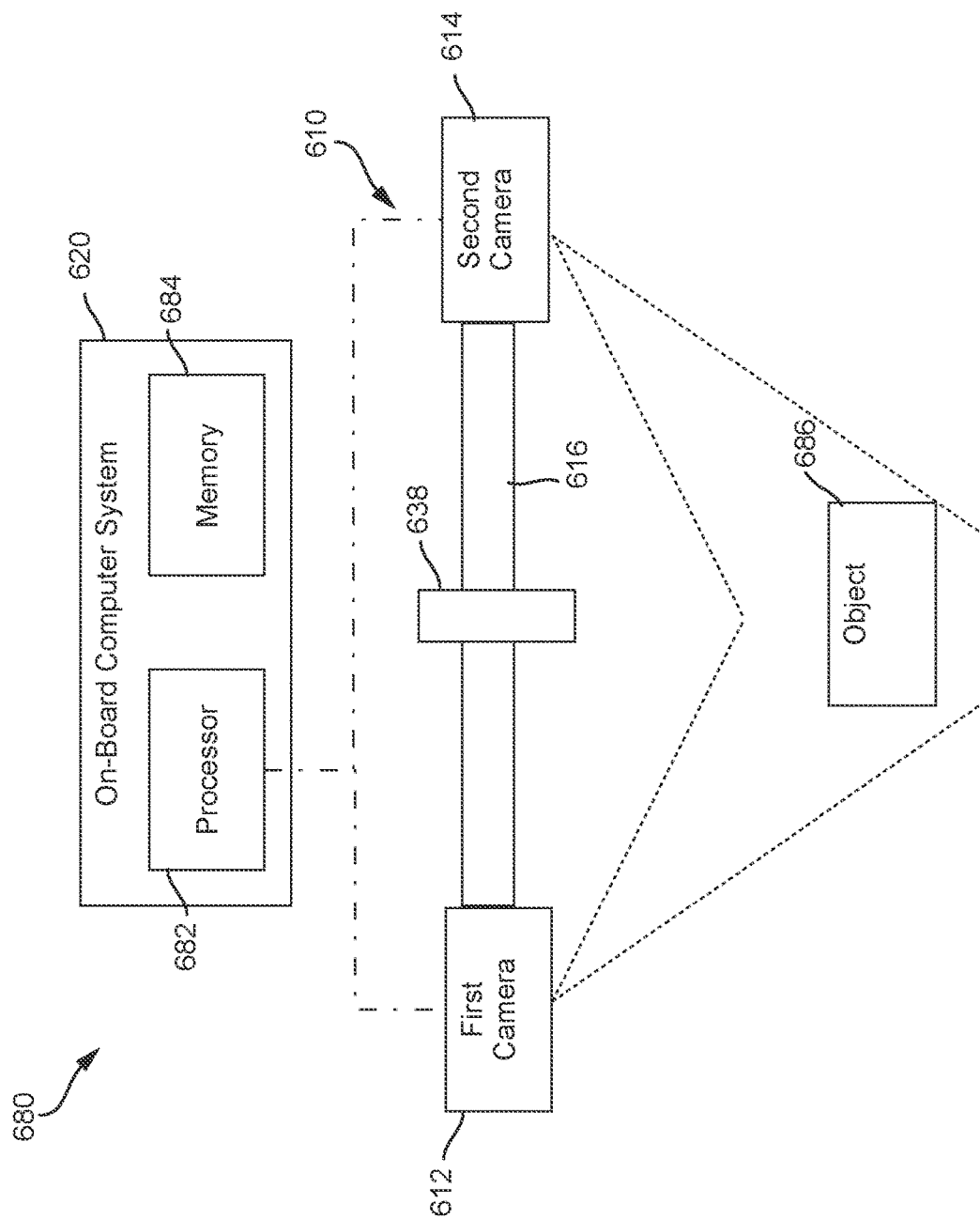
FIG. 6 is a system for generating stereo images from cameras connected to a mounting device that aligns cameras of a vehicle, according to an aspect of the disclosure.

FIG. 6 shows a system 680 for generating stereo images from the cameras 612, 614, which can be similar or identical to the previously described cameras 312, 314 shown in FIG. 3J. As in previous embodiments, the cameras 612, 614 are connected to and supported by a mounting device 610, which can be similar or identical to the previously described mounting devices 310, 410. For example, the first camera 612 can be connected to a first camera mount 624 of the mounting device 610 and the second camera 614 can be connected to a second camera mount 626 of the mounting device 610. The system 680 further comprises a controller or processor 682, such as a computer processor of the on-board computing device 220 (shown in FIG. 2), and computer memory 684 comprising instructions for obtaining, processing, storing, and transmitting images captured by the cameras 612, 614. The controller or processor 682 is in electrical communication with the first camera 612 and the second camera 614. The controller or processor 682 is configured to receive and process pairs of images substantially simultaneously captured by the first camera 612 and the second camera 614. Based on the received images, the controller or processor 682 is configured to generate stereo images of objects 686 in a scene from the pairs of images. As previously described, the generated stereo images can be analyzed by the processor 682 and/or by other computing devices or systems to determine information about the scene including, for example, a distance between objects 686 in the scene and a distance between objects 686 and the cameras 612, 614. The determined distance or depth information along with information from other sensors of a vehicle perception system can be used to identify certain objects 686 in a scene and/or to control navigation of the vehicle.

The on-board computing device 220 (shown in FIG. 2) of the vehicle 102a can be implemented using a computer system, such as the exemplary computer system 700 shown in FIG. 7. The computer system 700 can be any computer capable of performing the functions described herein. With reference to FIG. 7, the computer system 700 includes one or more processors (also called central processing units, or CPUs), such as a processor 704. The processor 704 is connected to a communication infrastructure or bus 706.

One or more processors 704 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

The computer system 700 also includes user input/output device(s) 703, such as monitors, keyboards, pointing devices, etc., that communicate with communication infrastructure 706 through user input/output interface(s) 703.

The computer system 700 also includes a main or primary memory 708, such as random access memory (RAM). The main memory 708 may include one or more levels of cache. The main memory 708 has stored therein control logic (i.e., computer software) and/or data.

The computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 reads from and/or writes to removable storage unit 818 in a well-known manner.

According to an exemplary embodiment, secondary memory 710 may include other means, instrumentalities, or other approaches for allowing computer programs and/or other instructions and/or data to be accessed by computer system 700. Such means, instrumentalities, or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

The computer system 700 may further include a communication or network interface 724. The communication interface 724 enables computer system 700 to communicate and interact with any combination of remote devices, remote networks, remote entities, etc. (individually and collectively referenced by reference number 728). For example, communication interface 724 may allow the computer system 700 to communicate with remote devices 728 over communications path 726, which may be wired and/or wireless, and which may include any combination of LANs, WANs, the Internet, etc. The control logic and/or data may be transmitted to and from computer system 700 via communication path 726.

In some examples, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use embodiments of this aspect of the disclosure using data processing devices, computer systems, and/or computer architectures other than that shown in FIG. 7. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A mounting device, comprising:
   an elongated beam comprising a first end portion, a second end portion, and a side surface extending between the first end portion and the second end portion;
   a first camera mount attached to the first end portion configured to support a first camera;
   a second camera mount attached to the second end portion configured to support a second camera; and
   a bracket positioned between the first end portion and the second end portion for fixedly connecting the elongated beam to a vehicle, the bracket comprising at least one base configured to be attached to the vehicle and a wall extending from the at least one base comprising an opening sized to receive the elongated beam, such that engagement between the wall and the elongated beam restricts rotation of the elongated beam about multiple axes,
   wherein the elongated beam comprises a first material and the bracket comprises a second material, wherein a coefficient of thermal expansion (CTE) of the first material is less than the CTE of the second material.

2. The mounting device of claim 1, wherein the bracket is positioned a substantially equal distance between the first end portion and the second end portion.

3. The mounting device of claim 1, wherein the first end portion and the second end portion are free from direct rigid connections to the vehicle.

4. The mounting device of claim 1, wherein the bracket restricts rotation of the elongated beam in pitch and yaw directions.

5. The mounting device of claim 4, wherein the bracket further restricts axial rotation of the elongated beam.

6. The mounting device of claim 1, wherein at least a portion of the elongated beam extending through the opening of the wall comprises a hollow cylindrical tube.

7. The mounting device of claim 1, wherein the elongated beam comprises a hollow cylindrical tube comprising a sidewall with a thickness of from about 2.0 mm to about 3.0 mm.

8. The mounting device of claim 1, wherein the elongated beam comprises carbon fiber and the bracket comprises aluminum or an aluminum alloy, and
   wherein the bracket is configured to be secured to a portion of the vehicle comprising aluminum or an aluminum alloy.

9. The mounting device of claim 1, further comprising an adhesive that adheres the side surface of the elongated beam to an inner surface of the wall,
   wherein the adhesive comprises a cured epoxy and a plurality of spacers embedded in the cured epoxy for maintaining substantially equal spacing between the side surface of the beam and the inner surface of the wall.

10. The mounting device of claim 9, wherein the plurality of spacers comprise glass beads.

11. The mounting device of claim 1, wherein the at least one base comprises a plurality of openings, each of which is configured to receive a fastener to attach the at least one base to the vehicle.

12. The mounting device of claim 1, wherein the at least one base comprises a first base portion configured to be attached to a first portion of the vehicle and a second base portion extending from the first base portion configured to be attached to a second portion of the vehicle.

13. The mounting device of claim 12, wherein the first base portion is configured to be mounted to an exterior surface of a roof of the vehicle and the second base portion is configured to be mounted to a sensor frame positioned on the roof of the vehicle.

14. The mounting device of claim 1, further comprising one or more vibration dampers positioned between at least one of the first end portion and the vehicle and the second end portion and the vehicle.

15. The mounting device of claim 14, further comprising at least one fastening member extending from one of the first and second end portions to the vehicle, wherein the one or more vibration dampers comprise elastomeric sleeves extending around the at least one fastening member.

16. The mounting device of claim 1, further comprising:
    a first fastening member extending through the first end portion that secures the first end portion to the vehicle; and
    a second fastening member extending through the second end portion that secures the second end portion to the vehicle,
    wherein the first fastening member and the second fastening member each comprises a first end comprising a head, a second end engaged to the vehicle, an upper elastomeric sleeve positioned between the head and the elongated beam, and a lower elastomeric sleeve positioned between the elongated beam and the vehicle.

17. The mounting device of claim 16, wherein at least the lower elastomeric sleeves are under compression in order to absorb vibrations exerted by the vehicle to the mounting device.

18. A mounting device, comprising:
    an elongated beam formed from a first material and comprising a first end portion, a second end portion, and a side surface extending between the first end portion and the second end portion;
    a first camera mount attached to the first end portion configured to support a first camera;
    a second camera mount attached to the second end portion configured to support a second camera; and
    a bracket formed from a second material positioned between the first end portion and the second end portion for fixedly connecting the elongated beam to a vehicle, the bracket comprising at least one base configured to be attached to the vehicle and a wall extending from the at least one base comprising an opening sized to receive the elongated beam,
    wherein the side surface of the elongated beam is adhered to an inner surface of the wall by an adhesive, the adhesive comprising a cured epoxy and a plurality of spacers embedded in the cured epoxy for maintaining substantially equal spacing between the side surface of the beam and the inner surface of the wall, and
    wherein the elongated beam comprises a first material and the bracket comprises a second material, wherein a coefficient of thermal expansion (CTE) of the first material is less than the CTE of the second material.

* * * * *